(12) United States Patent
Kitagawa et al.

(10) Patent No.: US 6,282,493 B1
(45) Date of Patent: Aug. 28, 2001

(54) VEHICLE NAVIGATION DEVICE

(75) Inventors: Takakiyo Kitagawa, Hyogo; Hidehiko Ohki, Tokyo, both of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/242,025

(22) PCT Filed: Jul. 22, 1997

(86) PCT No.: PCT/JP97/02292

§ 371 Date: Feb. 5, 1999

§ 102(e) Date: Feb. 5, 1999

(87) PCT Pub. No.: WO99/01855

PCT Pub. Date: Jan. 14, 1999

(51) Int. Cl.$^7$ ............................................... G06F 7/00
(52) U.S. Cl. ................................... 701/211; 340/995
(58) Field of Search .................................. 701/200, 204, 701/207, 208, 211, 212; 340/988, 990, 995

(56) References Cited

U.S. PATENT DOCUMENTS 5,023,798   6/1991   Neukirchner et al. ............... 701/208

FOREIGN PATENT DOCUMENTS

| 63-24398 | 2/1988 | (JP) . |
| 63-271109 | 11/1988 | (JP) . |
| 63-271110 | 11/1988 | (JP) . |
| 3-28414 | 3/1991 | (JP) . |
| 5-94129 | 4/1993 | (JP) . |
| 6-307878 | 11/1994 | (JP) . |
| 7-55483 | 3/1995 | (JP) . |
| 8-138193 | 5/1996 | (JP) . |
| 8-194897 | 7/1996 | (JP) . |
| 9-101159 | 4/1997 | (JP) . |

Primary Examiner—William A. Cuchlinski, Jr.
Assistant Examiner—Edward Pipala
(74) Attorney, Agent, or Firm—Sughrue, Mion, Zinn, Macpeak & Seas, PLLC

(57) ABSTRACT

Using a stored data in a map information storage section which is a storage medium such as a CD-ROM or the like, a vehicle navigation device comprises a schematic map calculation section which performs calculations of a schematic map of roads, a distance calculation section which calculates a distance from an arbitrary geographical point to a facility, a display selection section which selects a facility within a fixed distance from an arbitrary geographical point based on a calculation result in a distance calculation section, and a display control section which displays facilities selected from the display selection section and a schematic map obtained from the schematic map calculation section on a schematic map on a display section.

15 Claims, 33 Drawing Sheets

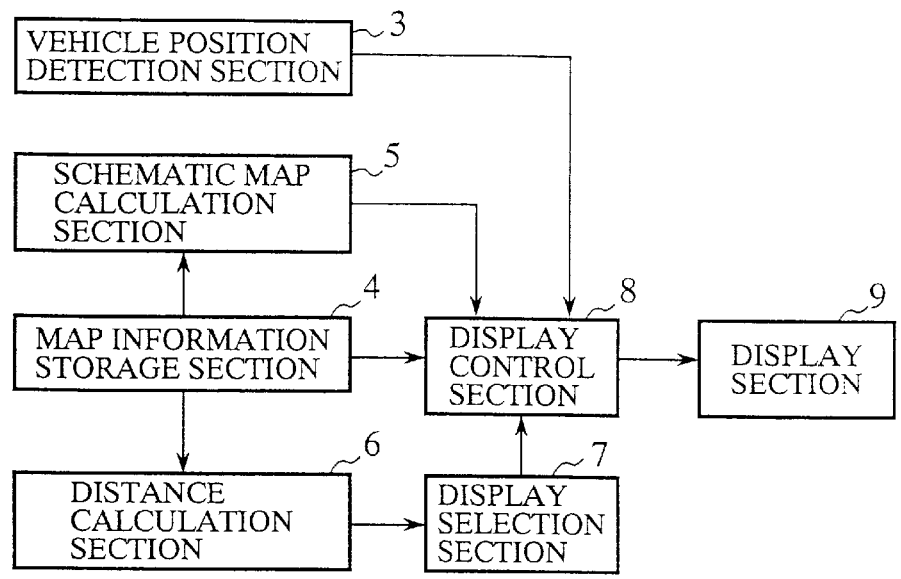
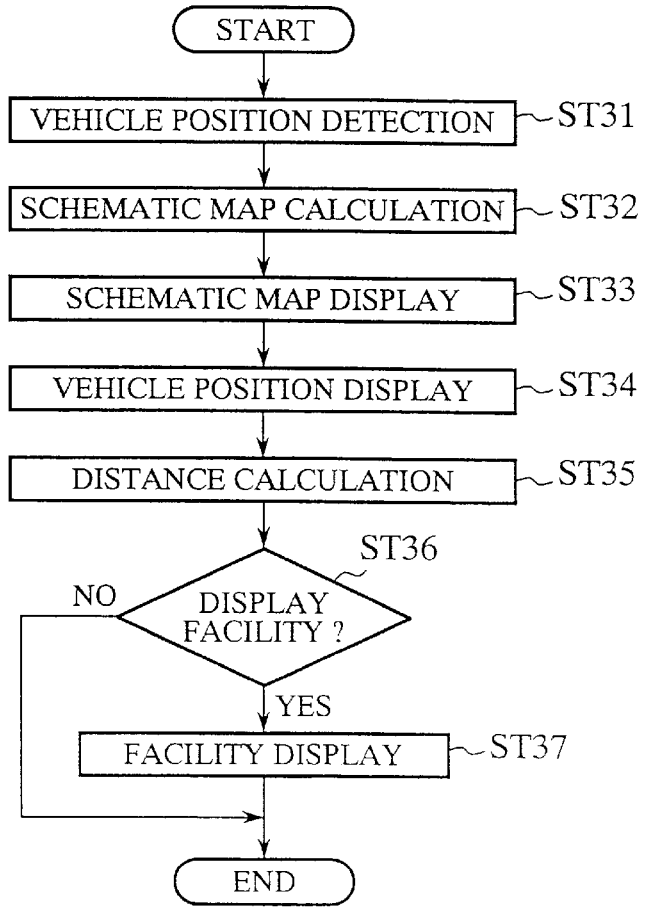

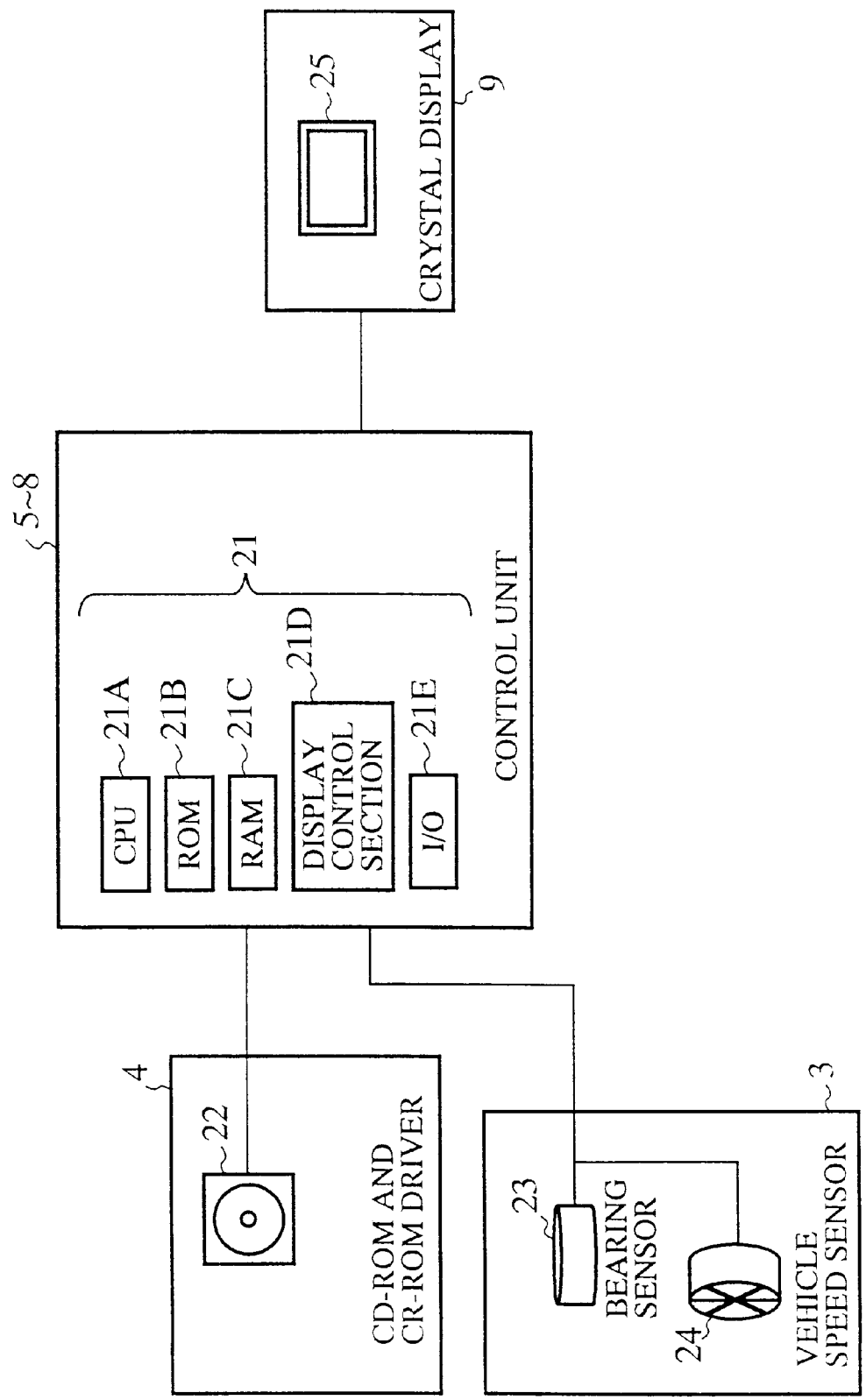

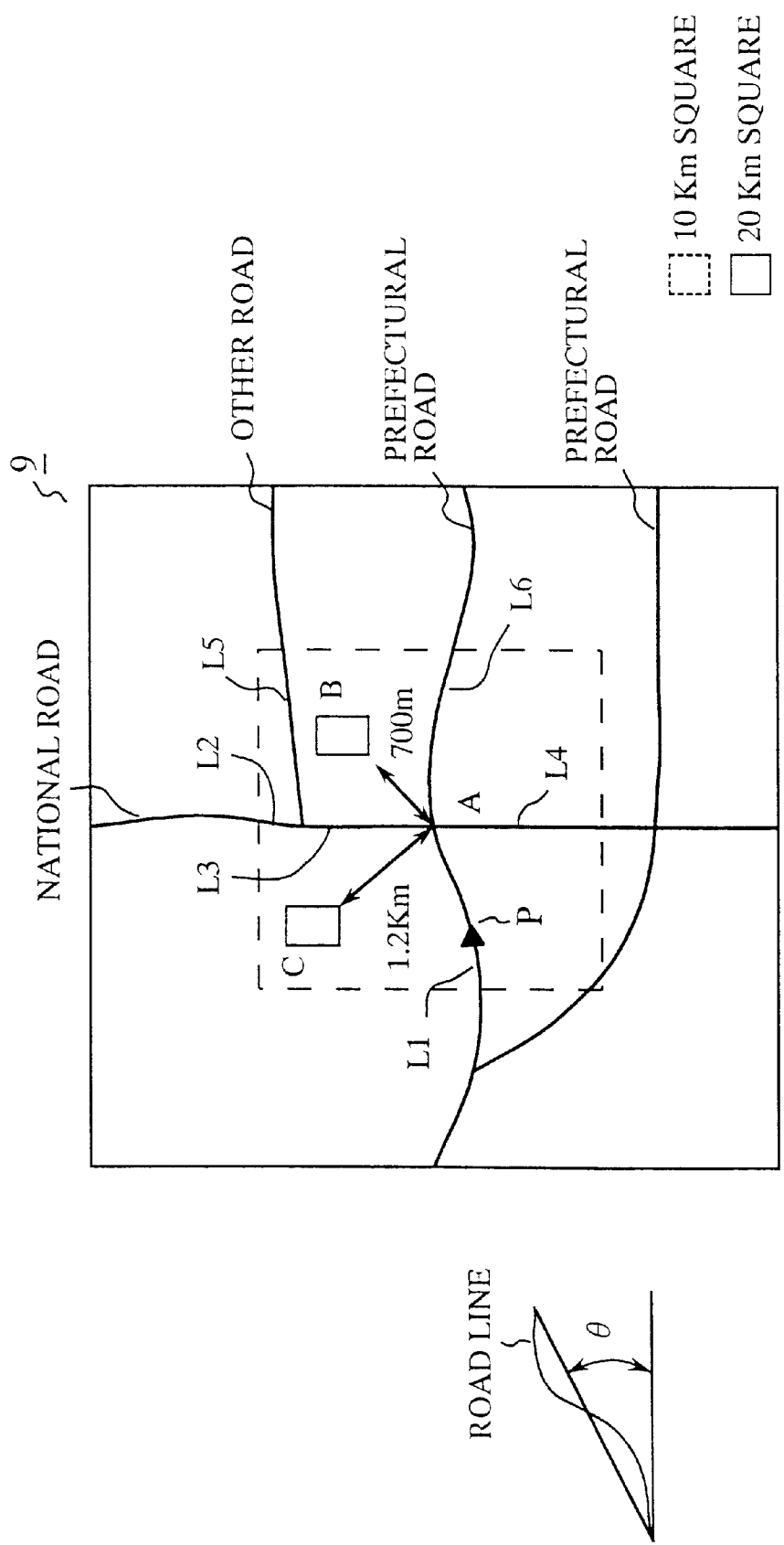

SUBSCREEN 91

VEHICLE NAVIGATION DEVICE

FIELD OF THE INVENTION

The present invention relates to a navigation device mounted in a vehicle. More particularly it relates to a navigation device mounted in a vehicle which displays information relating to various kinds of facilities existing in the proximity of an arbitrary geographical point on a road in a schematic road map.

BACKGROUND ART

In conventional vehicle mounted navigation devices, there is a display. For example, information relating to facilities on expressways, such as service areas (SA) and parking areas (PA), as well as a deformation map of the national highway can be displayed on a crystal display in an integrated format.

FIG. 52 shows an example of a display on a crystal display (display unit) according to the present invention. In the figure, 52 is a crystal display showing a road map or a schematic road map of roads. The vehicle's present position and a deformation map of the expressway comprising designated geographical points on the expressway are displayed on the crystal display. These designated geographical points are various kinds of schematic map information relating to the expressway such as interchange designations (IC), service area designations (SA) and parking area designations (PA). The example of the crystal display 52 of a conventional vehicle mounted navigation device shown in FIG. 52 is disclosed for example in JP-A-7-168996.

FIG. 53 shows facility information displayed on a crystal display 52 in the conventional vehicle mounted navigation device shown in FIG. 52.

An operator such as a driver selects a display such as service area (SA) or parking area (PA) displayed on the crystal display 52 shown in FIG. 52 from the touch panel. When they touch the screen, facility information relating to the selected service area (SA) or parking area (PA) is displayed on the crystal display 52.

Since the conventional vehicle mounted navigation device is constructed as discussed above, roads are displayed in an schematic map form, that is to say, only facilities on the expressway are displayed. In order for various types of facilities located in areas off the road, which in this case is an expressway, or information of use to the operator, such as a driver, to be displayed, it is necessary to return to the map display shown in FIG. 52 another time. Furthermore even after returning to that display, it is necessary to go through the complicated operations of searching for the target facility on the map, selecting it and touching the screen. Thus it has entailed the problem that the operation is tedious for the operator.

Furthermore when a normal non-schematic map is displayed on a crystal display and various kinds of facilities are displayed on the map, as all kinds of facilities are displayed across the entire map displayed on the crystal display, the problem has arisen that it is troublesome and complicated for the operator to recognize the target facility.

The present invention is proposed to solve the above problems. It is the purpose of the present invention to provided a vehicle mounted navigation device having the function of displaying, on an schematic map, various kinds of facility information other than that located on the automobile road being the object of the schematic map. This information can be obtained when the vehicle is using automobile roads such as expressways and tollways or general roads such as national, prefectural or municipal roads.

Furthermore the present invention has the purpose of providing a vehicle mounted navigation device which performs road map simplification process and which displays facilities near to an arbitrary geographical point in combination with the schematic map even when the vehicle is located on or is currently moving in an area other than an automobile-only road.

The present invention has the purpose of providing a vehicle mounted navigation device which is capable of easily providing the operator with detailed information regarding facilities displayed on the schematic map. Such information relating to facilities on a schematic map displayed on a crystal display which comprises a display unit is displayed in a composite form showing the distance, bearing and the like from an arbitrary geographical point.

Furthermore the present invention has the purpose of providing a vehicle mounted navigation device in which the category of facility can be selected on the schematic map displayed on the crystal display and in which the operation can easily, quickly and accurately understand the target facility.

Furthermore the present invention has the purpose of providing a vehicle mounted navigation device which displays facilities on a schematic map displayed on a crystal display and in which the route from an arbitrary geographical point to the target facility selected by the operator, such as a driver, is provided to that operator.

DISCLOSURE OF THE INVENTION

The vehicle mounted navigation device of the present invention as defined by claim 1 comprises a map information storage section which stores various information relating to maps, a schematic map calculation section which reduces roads to plan form based on data stored in said map information storage section and which generates a schematic map, a distance calculation section which calculates the distance from an arbitrary geographical point to a target facility, a display selection section which selects a facility which is displayed on said schematic map based on a distance supplied by said distance calculation section, a display section which performs the display of said map or said schematic map and a display control section which displays said facility on said schematic map displayed on said display section. In this way, the operator can easily understand facility information in the vicinity of an arbitrary geographical point.

The vehicle mounted navigation device of the present invention as defined by claim 2 is characterized in that said display selection section selects an object within a distance from an arbitrary geographical point to a facility within a fixed distance as obtained by the distance calculation section and said display control section displays said selected facility selected by said display selection section on a schematic map displayed on said display section. In such a way, the operator can easily understand information relating to various facilities located in a fixed distance in the vicinity of an arbitrary geographical point.

The vehicle mounted navigation device of the present invention as defined by claim 3 is characterized in that said display control section displays a distance obtained from said distance calculation section at a position adjacent to said facility on the schematic map as facility information displayed on the display section. In such a way, the operator can easily understand information relating to the distance from an arbitrary geographical point to a facility.

The vehicle mounted navigation device of the present invention as defined by claim 4 further comprises a bearing calculation section which calculates a bearing from an arbitrary geographical point to a facility based on data stored in said map information storage section and said display control section displays a bearing from an arbitrary geographical point to a facility on a schematic map as information relating to said facility displayed on the display section based on the calculation result obtained from said bearing calculation section. In this way, the operator can easily understand information relating to a bearing from an arbitrary geographical point to a facility.

The vehicle mounted navigation device of the present invention as defined by claim 5 further comprises a trip calculation section which calculates the running distance that must be traveled on an actual road map from an arbitrary geographical point to a facility based on data stored in said map information storage section and which sets the running distance from said arbitrary geographical point to said facility on said map as a trip distance from said arbitrary geographical point to said facility on said map. In this way, the operator can easily understand brief facility information relating to a trip distance from an arbitrary geographical point to a facility.

The vehicle mounted navigation device of the present invention as defined by claim 6 is further characterized in that said display selection section selects an object within a fixed distance on the basis of the trip value to a facility from an arbitrary geographical point obtained from the trip calculation section and said display control section displays said trip value selected by said display selection section on the facility side of the schematic map displayed on the display section. In this way, the operator can easily understand information relating to a trip distance from an arbitrary geographical point to a facility and brief facility information represented by a trip value from an arbitrary geographical point to a facility.

The vehicle mounted navigation device of the present invention as defined by claim 7 is further comprised of a vehicle position detection section which detects a present position of said vehicle and wherein said distance calculating section sets the present position of said vehicle as obtained from said vehicle position detection section as an arbitrary geographical point and calculates a distance to a facility. In this way, the operator can easily understand information relating to facilities in the vicinity of the present position of the automobile and facility information in the vicinity of the present position of the automobile can be displayed on the schematic map.

The vehicle mounted navigation device of the present invention as defined by claim 8 is further comprised of an arrival time calculation section which calculates the arrival time from an arbitrary geographical point to a facility and wherein said display control section displays, on the schematic map displayed on the display, said arrival time from an arbitrary geographical point to a facility obtained from said arrival time calculation section as facility information displayed on the display. In this way, the operator can easily understand information relating to an arrival time from an arbitrary geographical point to a facility.

The vehicle mounted navigation device of the present invention as defined by claim 9 is further comprised of an operational section by which the operator can perform operations and a route calculation section which calculates a route from an arbitrary geographical point to a facility selected by the operator using said operational section and wherein said display control section displays a route obtained from said route calculation section on the schematic map displayed on the display. In this way, the operator can easily understand information relating to route from an arbitrary geographical point to a facility.

The vehicle mounted navigation device of the present invention as defined by claim 10 is further comprised of an operational section which selects the category of facility displayed on the schematic map displayed on the display section and wherein the operator selects the desired displayed category of facility on the schematic map on the display section with said operation section and wherein said route calculation section calculates a route from an arbitrary geographical point relating to a facility obtained from said operational section and wherein said display control section displays a route obtained from said route calculation section on said schematic map displayed on said display section. In this way, the operator can easily understand information relating to categories of facilities about which information is needed.

The vehicle mounted navigation device of the present invention as defined by claim 11 is further comprised of a route attribute determination section which decides the attribute of a route based on data stored in said map information storage section and wherein when the attribute of the road obtained by said route attribute decision section is an automobile-only road, said schematic map calculation section calculates a schematic map of said automobile-only road based on data stored in said map information storage section, selects a facility which is not on said automobile-only road and said display control section displays said facility, selected by said schematic map calculation section, and said automobile-only road on the schematic map displayed on the display section. In this way an operator can easily understand the positional relationship of the facility and the automobile-only road.

The vehicle mounted navigation device of the present invention as defined by claim 12 is further characterized in that said display selection section selects an object in a fixed distance in the distance from an arbitrary geographical point to a facility obtained from said schematic map calculation section and said display control section displays said facility selected by said display selection section on the schematic map displayed on the display section.

The vehicle mounted navigation device of the present invention as defined by claim 13 is further characterized in that said schematic map calculation section sets an arbitrary geographical point as an interchange, a junction, a ramp, a service area or a parking area and calculates a schematic map to a facility. In this way the operator can easily understand facilities in the vicinity of an interchange (IC), a junction (JCT), a ramp (R), a service area (SA) or a parking area (PA).

The vehicle mounted navigation device of the present invention as defined by claim 14 is further characterized in that said display control section displays a plurality of facilities on a schematic map displayed on a display section, said facilities being displayed in fixed positions respectively corresponding to interchanges on said schematic map so that an operator can accurately understand whether it is a facility in the vicinity of all interchanges (IC) (junction (JCT), ramp (R), service area (SA) or parking areas (PA)) in a schematic map. In this way the operator can easily understand which interchange, junction, ramp, service area or parking area the facility is in the vicinity of.

The vehicle mounted navigation device of the present invention as defined by claim 15 comprises a map information storage section which stores various information relating to road maps or facilities, a control unit which reads information relating to said road maps or said facilities stored in said map information storage section, generates a schematic map by reducing said roads to plan form on the basis of obtained information and which stores and executes a program which selects said facility displayed on said schematic map corresponding to a distance from an arbitrary geographical point to a facility and a display section which displays said facility and said schematic map relating to said road obtained by said control unit. In this way, all or a part of the program can be stored on storage media such as a CD-ROM, can be read using a playing device from the storage media as necessary and can be used in image display processing. Hence changing the program is schematic and as a result it is easy to change a damaged part of or to load an updated version of the program.

BRIEF EXPLANATION OF THE DRAWINGS

FIG. 1 is a block diagram showing a vehicle navigation device according to a first embodiment of the present invention.

FIG. 2 is a block diagram showing the hardware arrangement of a vehicle navigation device according to a first embodiment of the present invention as shown in FIG. 1.

FIG. 3 is a flow chart showing the operation of a vehicle navigation device according to a first embodiment of the present invention as shown in FIG. 1.

FIG. 4 to FIG. 6 are explanatory diagrams showing a schematic map displayed on a display section of a vehicle navigation device.

PREFERRED EMBODIMENTS OF THE INVENTION

Figure 5:
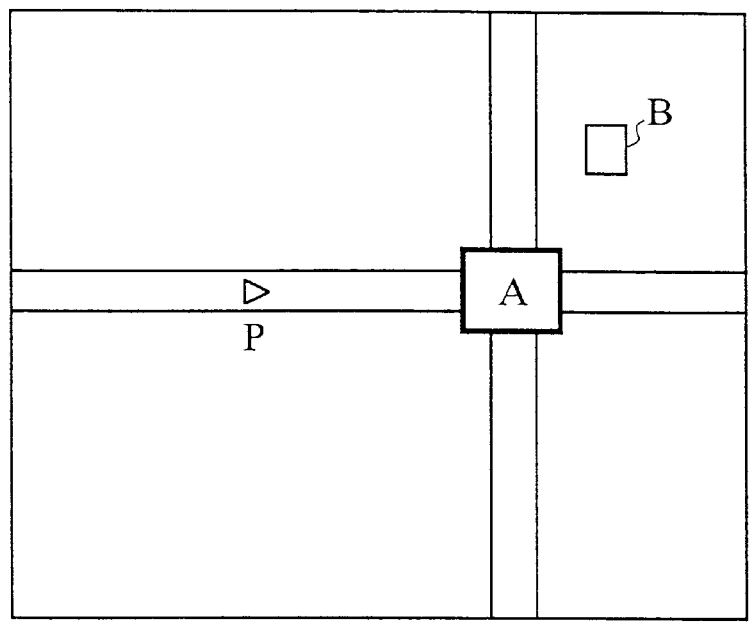

The preferred embodiments of the present invention will be explained in greater detail below while making reference to the accompanying drawings.

Embodiment 1

FIG. 1 is a block diagram showing a vehicle navigation device according to a first embodiment of the present invention. In the figure, reference numeral 3 denotes vehicle position detecting section which detects the present position P of a vehicle based on output data from sensors such as distance sensors, bearing sensors or a GPS (Global Positioning System). 4 is a map information storing section which stores various data regarding maps, information regarding facilities and road attributes of various kinds of links or roads (for example, expressways, national roads, prefectural roads or municipal roads). 5 is a schematic map calculation section which, on the basis of data sent from the map information storing section, reduces a displayed route to a direct line between arbitrary geographical points such as intersections and interchanges so that the operator can easily understand the bearing, the layout of intersections and the connection relationship of main roads such as automobile-only roads (expressways, tollways) or general roads (national roads, prefectural roads or municipal roads). The schematic map calculation section 5 also creates a schematic map by setting a length with a fixed value without any relationship to the actual distance. 6 is a distance calculation section which calculates the distance to various facilities such as leisure facilities, shops, restaurants, parking areas, gasoline stands from an origin road intersection point A using data sent from the map information storing section 4. 7 is a display selection section which, on the basis of the calculation result from the distance calculation section 6, extracts in sequence a fixed number of the shortest direct distances from the road intersection point A to each facility and selects a facility which is displayed on the display section 9.

8 is a display control section which collates the present vehicle position obtained from the vehicle position detecting section 3, the data from the map information storing section 4, the schematic map data from the schematic map section 5 and those facilities which have been designated to be displayed on the schematic map by the display selection section 7. The display control section generates an vehicle position signal P which shows the present position of the vehicle on the schematic map and a display signal for displaying the facility selected by the display selection section 7 on the display section 9. The display section 9 is for example a crystal display and displays images to the operator depending on the display signal sent from the display control section 8.

FIG. 2 is a block diagram showing the layout of the hardware of a vehicle navigation device according to a first embodiment as shown in FIG. 1. In the figure, 21 is a control unit which controls each calculation and the entire system. It comprises a schematic map calculation section 5, a distance calculation section 6, a display selection section 7 and a display control section 8. 22 is a CD-ROM driver which controls the CD-ROM on which the map information is stored and the operation of the CD-ROM and comprises a map information storing section 4. 23 is a bearing sensor which detects the running bearing of the vehicle. 24 is a vehicle speed sensor which detects the displacement of the vehicle and comprises a present position detection section 3. 25 is a crystal display for showing the contents of the signal from the control unit and comprises a display unit 9.

The control unit 21 is comprised of a CPU 21A, a ROM 21B on which is stored the program and indispensable information for the operation of the program, a RAM 21C which is the memory region used by the CPU when performing calculations, a display control section 21D which generates a signal which is sent to the crystal display and an interface I/O 21E which connects the control unit with the outside.

Next the operation of the invention will be explained.

Figure 6:
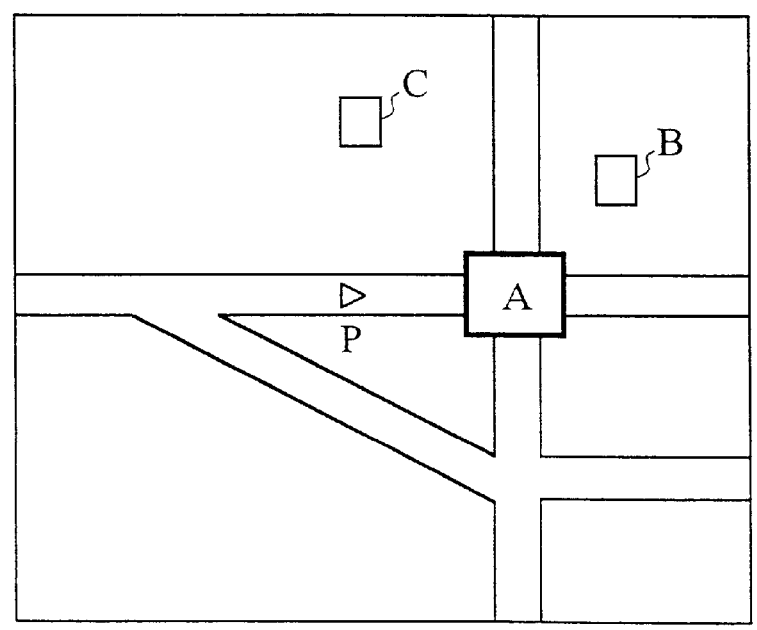

FIG. 3 is a flowchart showing the operation of a vehicle navigation device according to a first embodiment of the present invention as shown in FIG. 1. FIGS. 4–6 are explanatory diagrams showing schematic map displayed on the display section 7 of a vehicle navigation device.

Firstly in a step ST31, the vehicle position detecting section 3 detects the present vehicle position P based on output data from various sensors such as a distance sensor, a bearing sensor or a GPS (Global Positioning System).

Continuing onto a step ST32, the schematic map calculation section 5 performs calculations related to the road L1–L6 based on the map data for 10 km square obtained from the map information storing section 4 (refer to the dotted region in FIG. 4). First main roads such as national and prefectural roads L1–L4, L6 are selected. Next the ends of each national road L2, L3, L4 in the order of priority are joined by a straight line and the vehicle lanes are widened. Thus national roads L2 and L3 are thought of as one road due to omitting the intersections by removing other national roads from the crystal display.

Next the slope of the straight line θ is corrected to 0° if it is within 0–15°, and to 30° if it is between 15–45° (refer to FIG. 4.)

Next in a similar way to the above process, the prefectural roads L1 and L6 are reduced to a plan form and color contrasting is applied to each road division such as national or prefectural roads. In this way, the schematic map is easier for the operator to read. An example of this kind of display on the display section 9 is shown in FIG. 5.

Lastly depending on the result of steps ST31 and ST32 above, in a step ST33, the display control section 8 generates a signal in order to display a schematic map on the display section 9 and sends the signal to the display section 9. Thus in the process above, although 10 km square of map data was reduced to a schematic map, it is possible for example, to create a schematic map on a different reduced scale to the map data of the 10 km square as in the 20 km square region encircled by the solid line in FIG. 4. In this case, the screen shown in FIG. 6 is displayed on the display section 9.

Next in a step ST34, the vehicle position P is displayed on the schematic map which is displayed on the display section 9 on the basis of the detected results in the step ST31.

Then in a step ST35, the distance calculation section 6 calculates the distance from road intersection point A to each facility on the basis of the data stored in the map information storing section 4. In this case, the road intersection point A is set as the arbitrary geographical point.

In a step ST36, on the basis of the distance calculated in the step ST35, if the map is a 10 km square schematic map, facilities existing within 1 km are selected, if the map is a 20 km schematic map, facilities within 3 km are selected.

In the above process, by making a distance i=700 m from road intersection point A, which is the arbitrary geographical point, to the facility B or j=1.2 km from road intersection point A to facility C, when the schematic map is 10 km square, only the facility B is selected, and when the schematic map is 20km square, both facility B and facility C are selected.

Next in a step ST37, each selected facility is displayed on a schematic map displayed on the display section 9. At this time, the display position of the facilities B, C on the schematic map is displayed at a position from which the bearing, the distance and the like to the schematic map of the roads can be taken (refer to FIG. 4).

An example of a road map in plan form such as that shown in FIG. 4 is discussed below. Since the road intersection is taken to be the arbitrary geographical point, the distance i=700 m from the road intersection point A to the facility B, and the distance j=1.2 km from the road intersection point A to the facility C, on a 10 km square map, the only facility shown is facility B and a schematic map such as that shown in FIG. 5 is shown on the display section 9. The reference symbol P shows the current position of the vehicle. On the other hand, on a 20 km square map, the facilities shown in the schematic map are facilities B, C and a schematic map such as that shown in FIG. 6 is shown on the display section 9.

As shown above, in embodiment 1, the display on the schematic map is determined corresponding to the distance to the facilities in the vicinity of arbitrary geographical points. For example, distant facilities from the arbitrary geographical point are not shown, the unnecessary display of facilities is reduced and the display on the schematic map is schematic. Hence the operator can easily understand each kind of facility information in the vicinity of an arbitrary geographical point. Furthermore the program for displaying facilities and the schematic map on the display screen of the display section is stored beforehand in the ROM 21B which is the memory of the control unit 21. However all or some of this program may stored beforehand on an external recording medium such as a CD-ROM 22. The program may be read as necessary from this using an external recording medium 22 and used to process the screen display. Hence changing the program is schematic and it is a simple operation to change a damaged section or to install an improved version.

In embodiment 1, although the arbitrary geographical point was defined as a road intersection point A, it is possible to obtain the same effect with another point or facility such as a vehicle position or an interchange.

By using the touch sensor provided on the display section 9, the user may decide to designate the road intersection arbitrary geographical point as a point having a fixed relationship (for example, the intersection on the proposed route which is closest to the present position) with the present position, the proposed route, or target position.

Embodiment 2

In the vehicle navigation device in embodiment 1, the distance from the arbitrary geographical point to the periphery of a facility is calculated in the distance calculation device 6 and a selected facility is displayed on the schematic map based on the calculated result. It is also possible to display a distance from a road intersection arbitrary geographical point A to a selected displayed facility on the display section 9.

In the vehicle navigation device in embodiment 2, the distance from the road intersection point A which is the arbitrary geographical point to the selected and displayed facility is calculated and displayed on the display section 9.

Next the operation of the invention will be explained.

Figure 7:
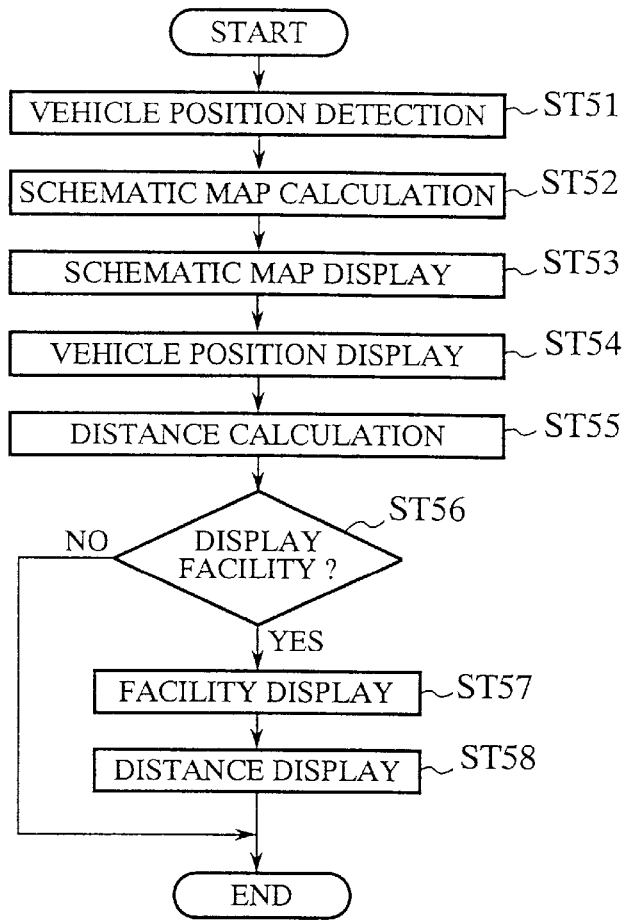
FIG. 7 is a flow chart showing the operation of a vehicle navigation device according to a second embodiment of the present invention.

FIG. 7 is a flowchart which shows the operation of a vehicle navigation device according to a second embodiment of the present invention. In particular, it is a flowchart which shows the order of the display of the distance.

Steps 51–57 in the flowchart in FIG. 7, are the same as steps 31–37 in the flowchart of the first embodiment of the invention and their explanation will not be repeated here.

In a step 58, the distance from a road intersection point A as calculated by the distance calculation section 6 is displayed in the schematic map on the display section 9.

Figure 8:
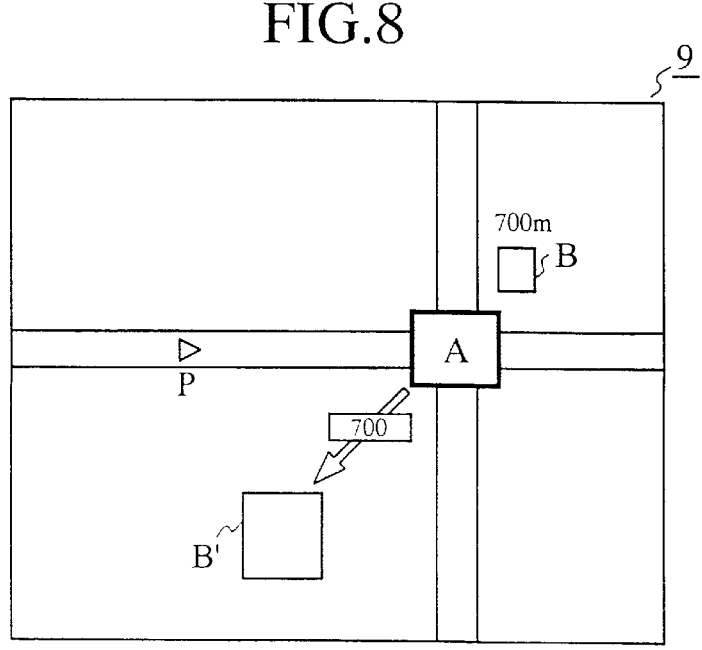
FIG. 8 is an explanatory diagram showing the distance and bearing to a facility displayed on a schematic map on a display section.

FIG. 8 is an explanatory diagram showing the result of the operation of step 58 in the flowchart shown in FIG. 7. The vehicle position P and the facility B are shown in the schematic map displayed on the display section 9. Since the distance from the road intersection point A to the facility B is shown together with the facility B on the display section 9, the operator is able to understand the facility information in the vicinity of the intersection more accurately. As shown in FIG. 8, in order to accurately display the point from which the distance to the facility B' is indicated, an arrow which shows the bearing from that point to the facility may be displayed together with the distance by the display selection section 7 and the display control section 8.

As shown above in the second embodiment, facilities in the vicinity of an arbitrary geographical point and the distance from an arbitrary geographical point to those facilities may be combined and displayed on a schematic map displayed on a display section. Hence an operator can easily obtain detailed road information.

The explanation in embodiment 2 took the arbitrary geographical point to be a road intersection point A, however the effect can be achieved if the point is a vehicle position, an interchange or another facility or geographical point.

Embodiment 3

Figure 9:
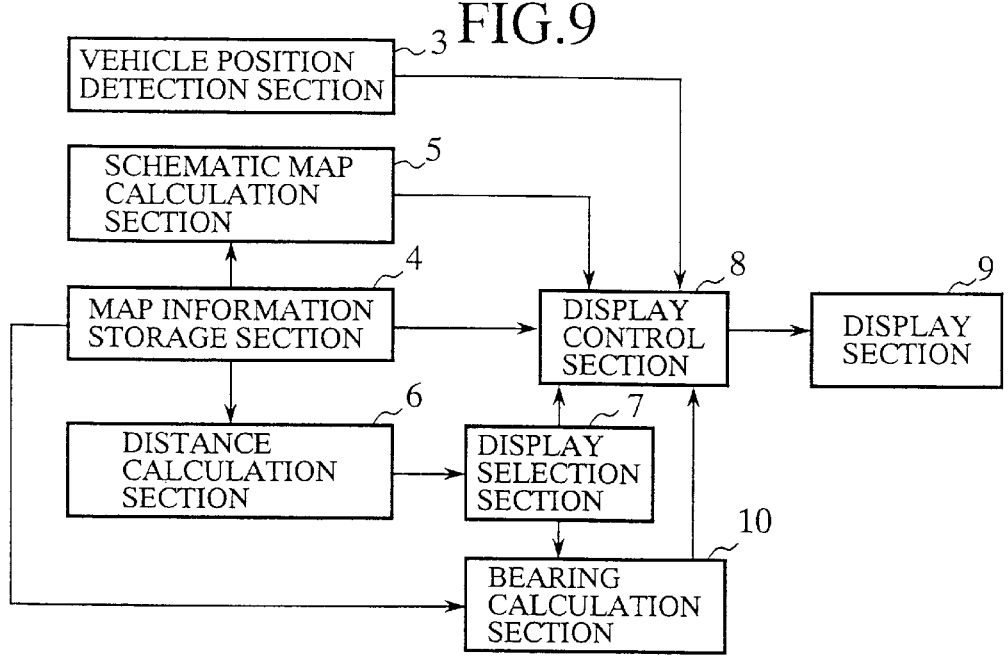
FIG. 9 is a block diagram showing of a vehicle navigation device according to a third embodiment of the present invention.

FIG. 9 is a block diagram showing a vehicle navigation device according to a third embodiment of the present invention. In the figure, reference numeral 10 is a bearing calculation section which calculates the direction to a facility B as seen from an road intersection point A based on data stored in the map information storage section 4. The other components 3–9 are the same as those in the first embodiment shown in FIG. 1 and will not be explained again here.

In the vehicle navigation device of the third embodiment, a bearing to a selected and displayed facility from an arbitrary geographical point for example a road intersection point A and the calculated result is displayed on the schematic map displayed on the display section 9.

Next the operation of the invention will be explained.

Figure 10:
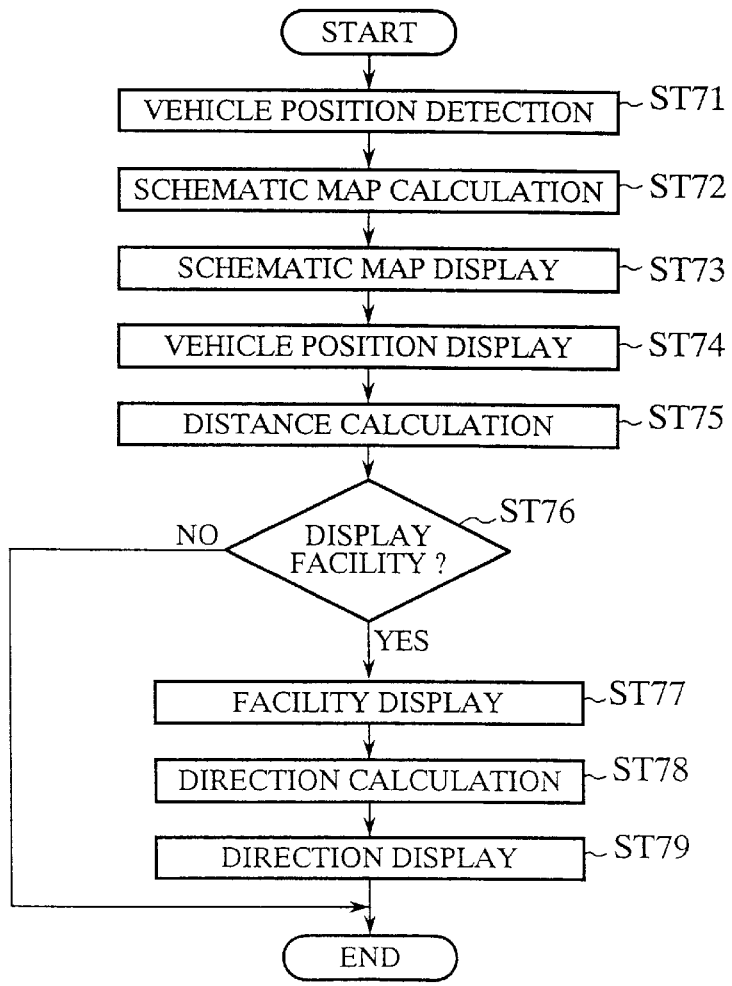
FIG. 10 is a flow chart showing the operation of a vehicle navigation device according to a third embodiment of the present invention as shown in FIG. 9.

FIG. 10 is a flowchart which shows the operation of a vehicle navigation device according to a third embodiment of the present invention. Steps ST71–77 in the flowchart as shown in FIG. 10 are the same as those of steps ST31–37 the first embodiment as shown in FIG. 3 and their explanation will not be repeated here.

Figure 11:
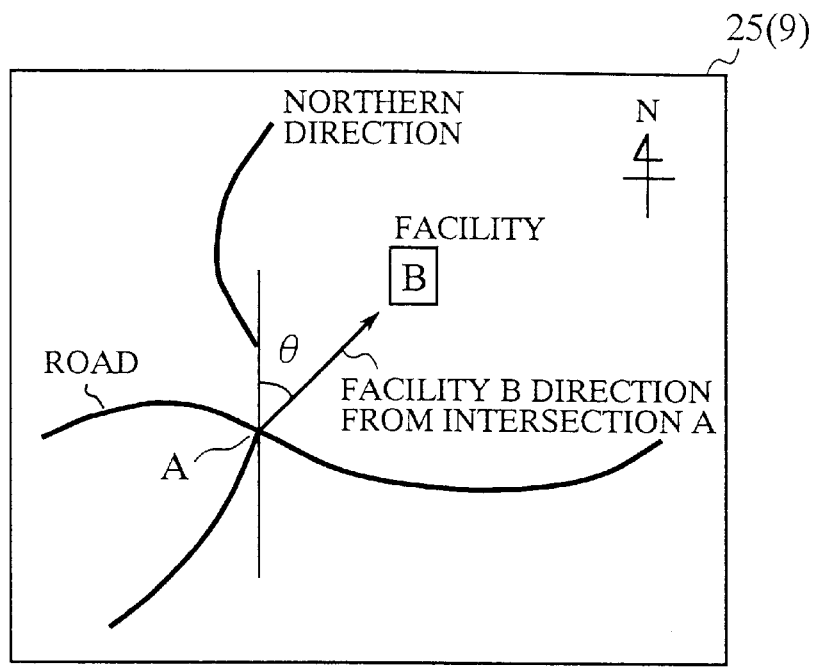
FIG. 11 is an explanatory diagram showing a bearing calculation method of the bearing θ to a facility B from a road intersection A.

FIG. 11 is an explanatory figure showing the method of calculating the bearing by determining the angle θ from the road intersection point A to the facility B.

In a step ST78, the bearing calculation section 10 connects the position of the intersection point A to the position of the facility B with a straight line using the data stored in the map information storage section 4. On the map, when north is set as the upper position on the crystal display 25 of the display section 9, the angle θ from the road intersection point A to the facility B is calculated by the slope of the straight line (refer to FIG. 11).

Next in a step ST79, the calculation result obtained by the bearing calculation section 10 is displayed as a mark, that is to say, a "bearing mark" which shows the bearing as an encircled arrow on the schematic map displayed on the display section 9.

Figure 12:
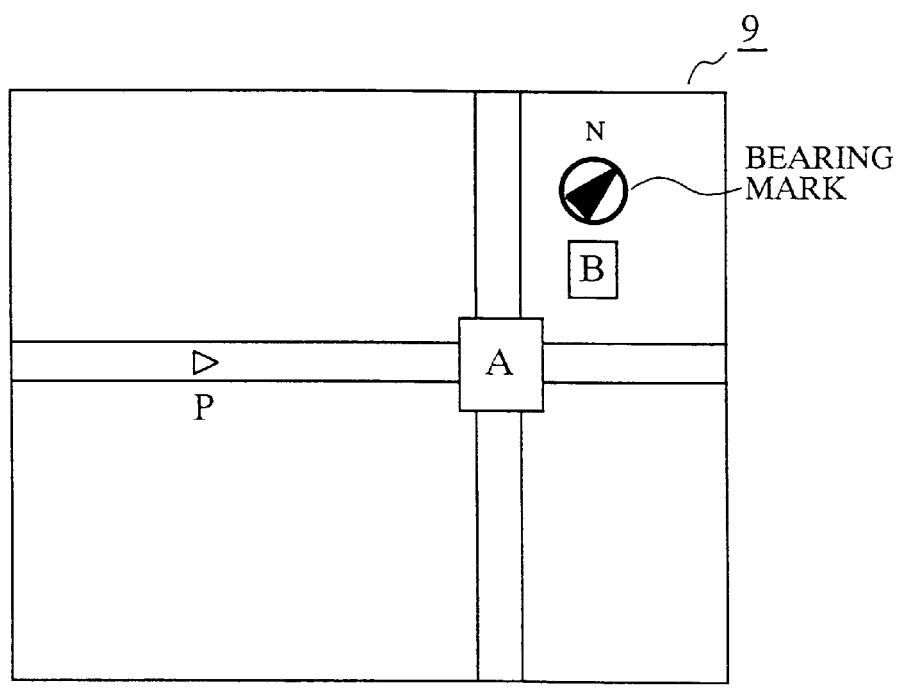
FIG. 12 is an explanatory diagram showing the bearing mark to a facility B from a road intersection A and the vehicle position P displayed on the schematic map on the display section.

As shown in FIG. 12, the facility B and the vehicle position P are displayed on the schematic map. Furthermore it is possible for the operator to accurately understand information about facilities in the vicinity of an intersection as the bearing of the facility B as seen from the road intersection point A is displayed by an arrow.

As shown above, in accordance with embodiment 3, the bearing calculation section 10 displays a bearing to a facility as seen from a arbitrary geographical point on a schematic map which is displayed on a display section. Hence the operator can accurately and easily understand information about facilities in the vicinity of an arbitrary geographical point.

The explanation of embodiment 3 used a road intersection point A as an arbitrary geographical point. However the same effect can be obtained by using a vehicle position, an interchange or another facility or geographical point.

Embodiment 4

Figure 13:
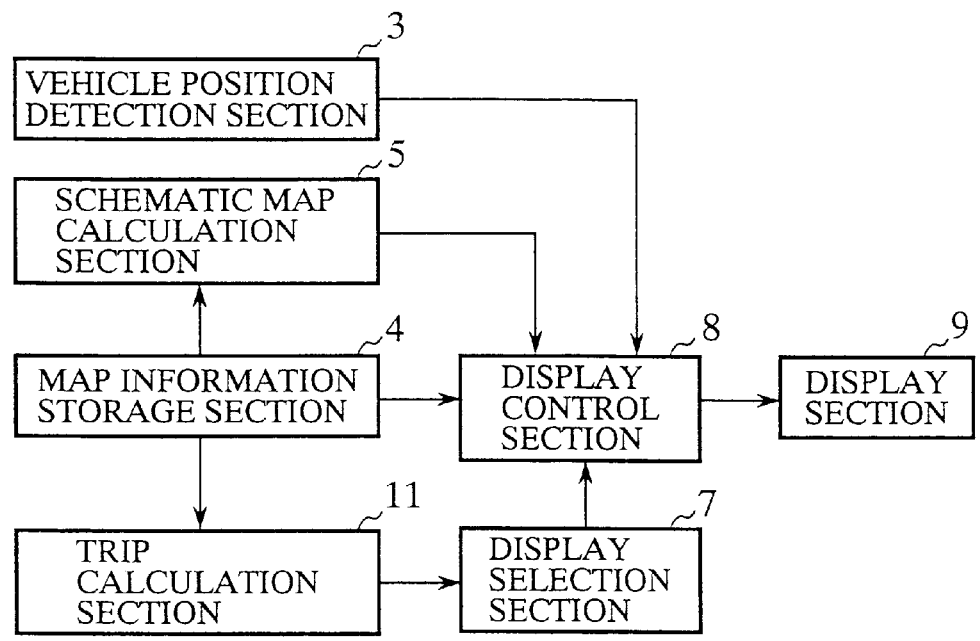
FIG. 13 is a block diagram showing of a vehicle navigation device according to a fourth embodiment of the present invention.

FIG. 13 is a block diagram which shows a vehicle navigation device according to a fourth embodiment of the present invention. In the figure, reference numeral 11 denotes a trip calculation device which calculates the trip from a road intersection point A which is the arbitrary geographical point to a facility B based on the data obtained from the map information storage section 4. The other components 3–5, 7–9 are the same as those in embodiment 1 shown in FIG. 1 and their explanation will not be repeated here.

The vehicle navigation device according to the fourth embodiment for example calculates the distance (the total running estimated distance to the facility) from a road intersection point A, which acts as an arbitrary geographical point, to a facility B and displays this on a display section 9.

Next the operation of the invention will be explained.

Figure 14:
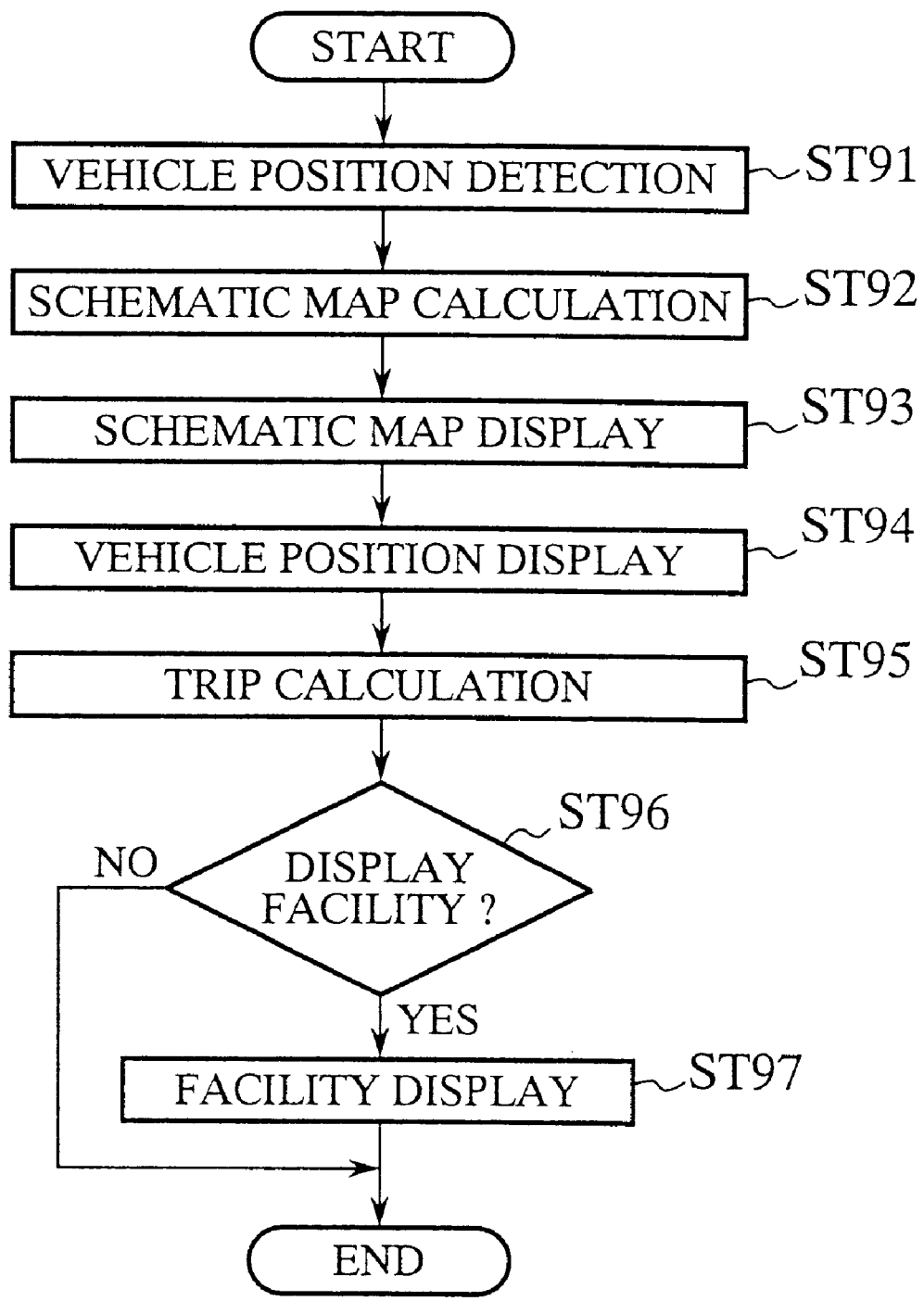
FIG. 14 is a flow chart showing the operation of a vehicle navigation device according to a fourth embodiment of the present invention as shown in FIG. 13.

FIG. 14 is a flowchart which shows the operation of the vehicle navigation device according to a fourth embodiment of the present invention as shown in FIG. 13.

Steps ST91–94 in the flowchart shown in FIG. 14 are the same as steps ST31–34 in the flowchart in the first embodiment shown in FIG. 3 and their explanation will not be repeated here.

In a step ST95, the trip calculation section 11 calculates the shortest route from the road intersection point A to the facility B based on the data in the map information storage section 4 and calculates the trip of the route.

In a step ST96, the trip is used to select a facility within 1 km on the basis of the trip calculated in the step ST95. When a facility B is selected. the result is displayed as facility B on the schematic map displayed on the display section 9 in a step ST97.

Figure 15:
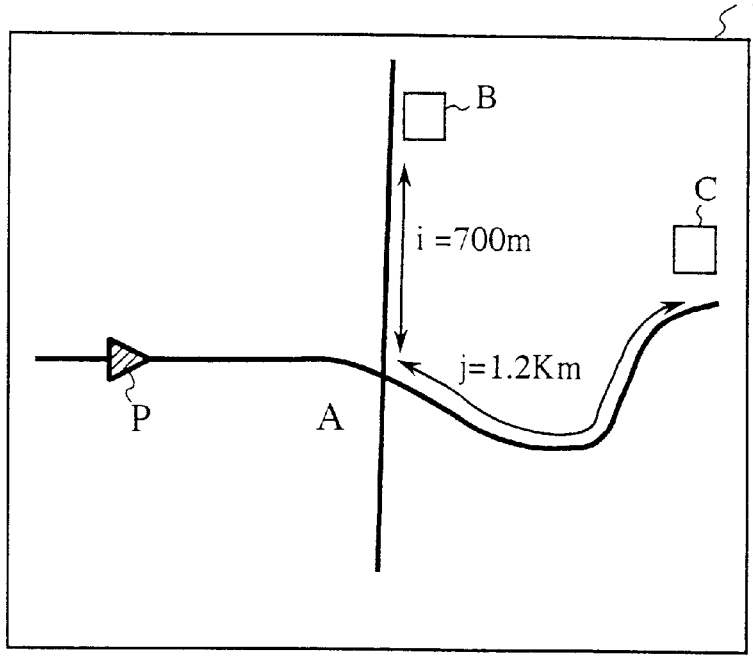
FIG. 15 and FIG. 16 are explanatory diagrams showing an example of a map and a schematic version thereof which are respectively displayed on a display section of a vehicle navigation device according to a fourth embodiment of the present invention.
Figure 16:
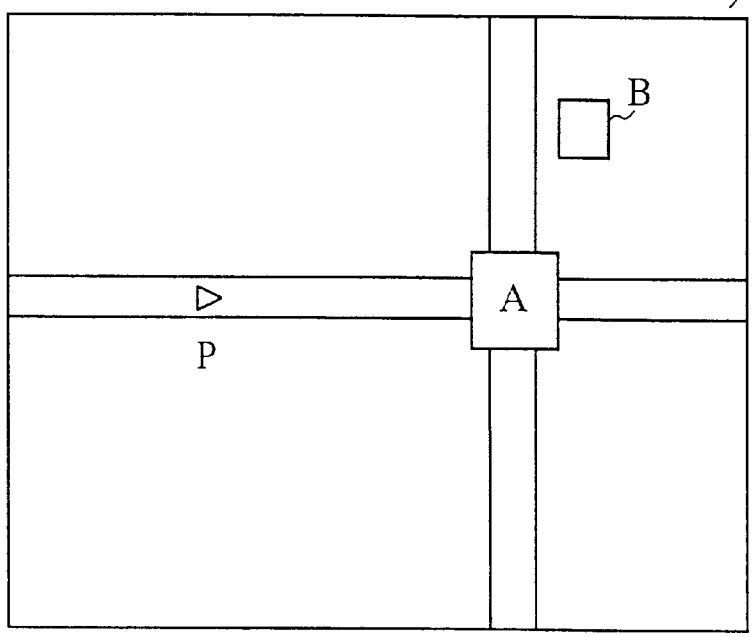

FIGS. 15 and 16 are explanatory diagrams which show an example of an original map and a schematic version of that map which are displayed on the display section 9 in a vehicle navigation device according to the fourth embodiment of the present invention.

FIG. 15 shows a road map in the vicinity of a road intersection point A. FIG. 16 is an example of the road map shown in FIG. 15 being displayed on a schematic map.

When the arbitrary geographical point is taken as the road intersection point A, the trip from the road intersection point A to the facility B is i=700 m and the trip from A to the facility C is j=1.2 km, the only facility displayed on the schematic map is facility B. The schematic map display as shown in FIG. 16 is displayed on the display section 9. In this context, reference symbol P shows the present position of the vehicle.

As above, according to embodiment 4, the trip calculation section 11 calculates the shortest route from the road intersection point A which acts as an arbitrary geographical point to a facility B based on the data stored in the map information storage section 4. It calculates the trip on the route which has been calculated and the display section 9 displays the calculation result on the schematic map. Hence the operator can easily understand the brief information about the trip from the intersection.

The explanation in embodiment 4 took the road intersection point A as the arbitrary geographical point. However the same effect can be obtained by using the vehicle position, an interchange or another facility or geographical point.

Embodiment 5

The first embodiment of a vehicle navigation device as shown in FIGS. 1–6 selects and displays a facility on a schematic map based on the calculation of the distance from an road intersection point A which acts as an arbitrary geographical point to a facility. The data regarding the vehicle position P obtained by the vehicle position detection section 3 is sent to the distance calculation section 6, and the distance from the vehicle position P to the facility B is calculated. Hence the operator can select a facility corresponding to a distance from the present position of the vehicle to the facility and obtain information regarding the selected facility.

Figure 17:
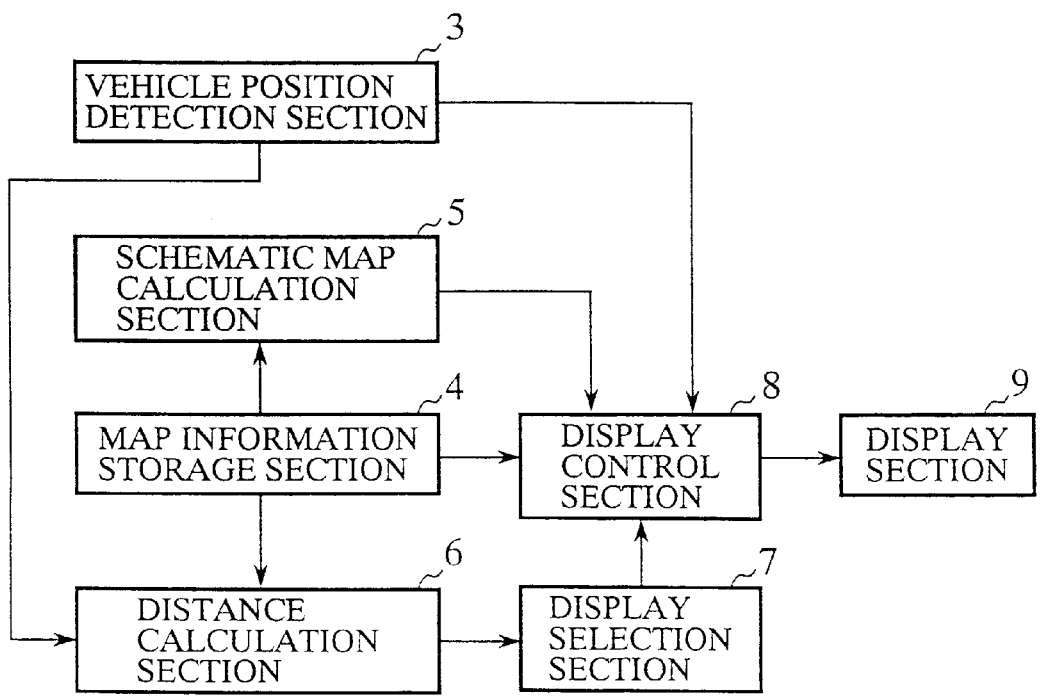
FIG. 17 is a block diagram showing of a vehicle navigation device according to a fifth embodiment of the present invention.

FIG. 17 is a block diagram showing a vehicle navigation device according to a fifth embodiment of the present invention. In the fifth embodiment, data regarding the present detected position of the vehicle P is directly sent to the distance calculation device 6 from the vehicle position detection device 3. The distance calculation device 6 calculates the distance from the present position of the vehicle P to the facility B. In this way, the present position of the vehicle P is set as the arbitrary geographical point and for example, the distance or the like from the present position of the vehicle P to the facility is calculated. Other components are the same as those in the first embodiment of the vehicle navigation device and will not be explained again here.

Figure 18:
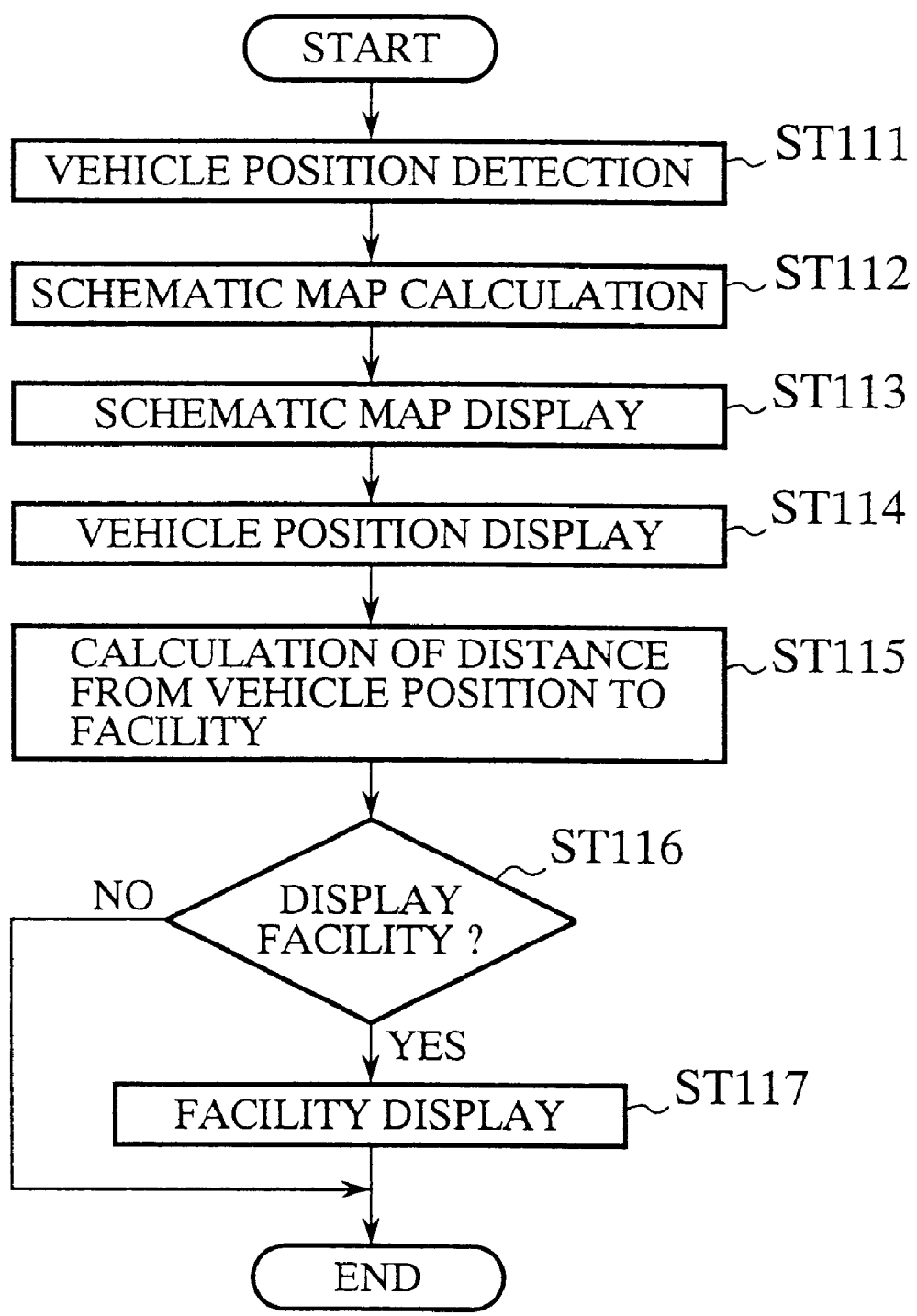
FIG. 18 is a flow chart showing the operation of a vehicle navigation device according to a fifth embodiment of the present invention as shown in FIG. 17.

Next the operation of the invention will be explained. FIG. 18 is a flowchart showing the operation of the vehicle navigation device according to a fifth embodiment of the present invention. Steps ST111–114 in the flowchart shown in FIG. 18 are the same as steps ST31–34 in the flowchart showing the operation of the first embodiment of the vehicle navigation device and their explanation will not be repeated here.

In a step ST115, the calculation of the distance from vehicle position P to the facility is performed in the distance calculation section 6 based on the data of the map information storage section 4 and the vehicle position P obtained from the vehicle position detection section 3.

Next in a step ST116, on the basis of the distance calculated by the distance calculation device an object within 10 km from the vehicle position P to a facility is selected as a facility for display. When it is decided to display facility B on the display section 9 as a result of this selection, in a step ST117, the display of facility B is performed on the display section 9.

Figure 19:
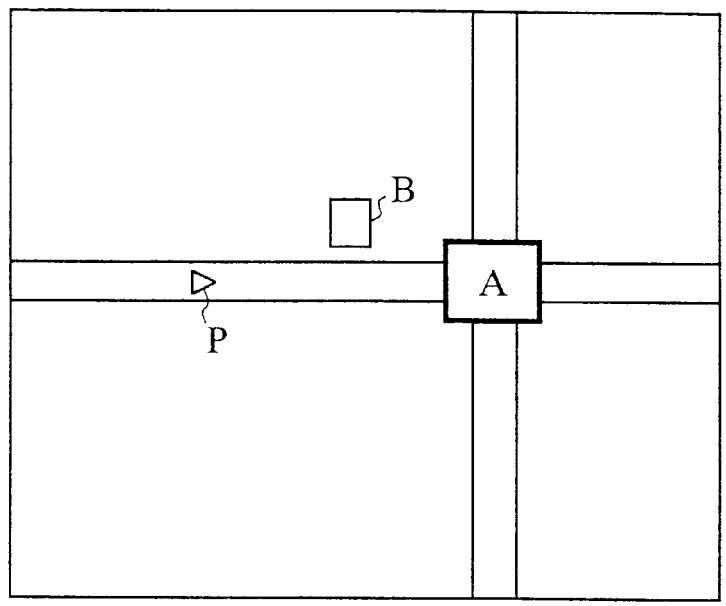
FIG. 19 is an explanatory diagram showing an example of a vehicle position P being set as an arbitrary geographical point on a schematic map display.

FIG. 19 is an explanatory diagram showing an example of the vehicle position P being set as the arbitrary geographical point being displayed on the display device 9. As shown in FIG. 19, the vehicle position P and facility B are displayed on a schematic map on the display device 9.

As shown above, according to embodiment 5, the data regarding the present position P of the vehicle detected by the vehicle position detection section 3 is directly sent to the distance calculation section 6 and the distance calculation section 6 calculates the distance from the vehicle position P to the facility B and it is displayed on a schematic map displayed on the display section 9. Hence the operator can accurately understand information about facilities in the vicinity of the vehicle position P.

Embodiment 6

Figure 20:
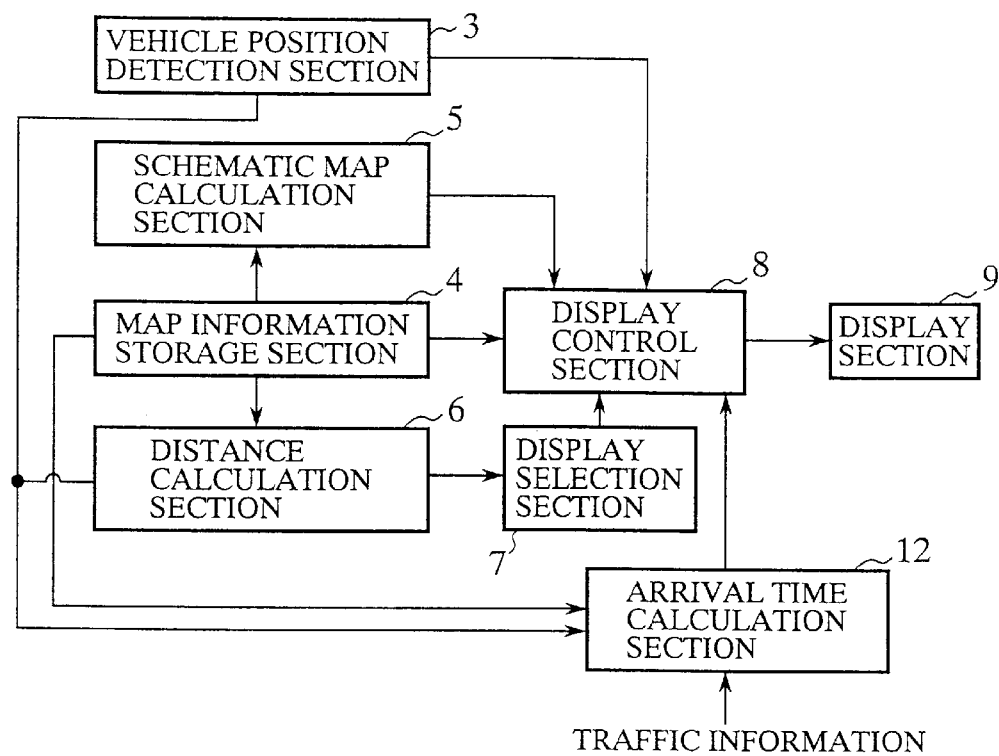
FIG. 20 is a block diagram showing of a vehicle navigation device according to a sixth embodiment of the present invention.

FIG. 20 is a block diagram showing a vehicle navigation device according to a sixth embodiment of the present invention. In the figure, reference numeral 12 denotes an arrival time calculation section which calculates the time required for the vehicle to arrive at the facility from its present position, that is to say, the estimated time of arrival, on the basis of data stored in the map information storage device and data regarding the vehicle position P obtained from the vehicle position detection device 3. The result of the calculation performed by the arrival time calculation device is sent to the display control section 8 and is displayed on the schematic map on the display section 9 under the control of the display control 8. The other components are the same as those in the first embodiment of the vehicle navigation device and will not be explained again here.

Next the operation of the invention will be explained.

Figure 21:
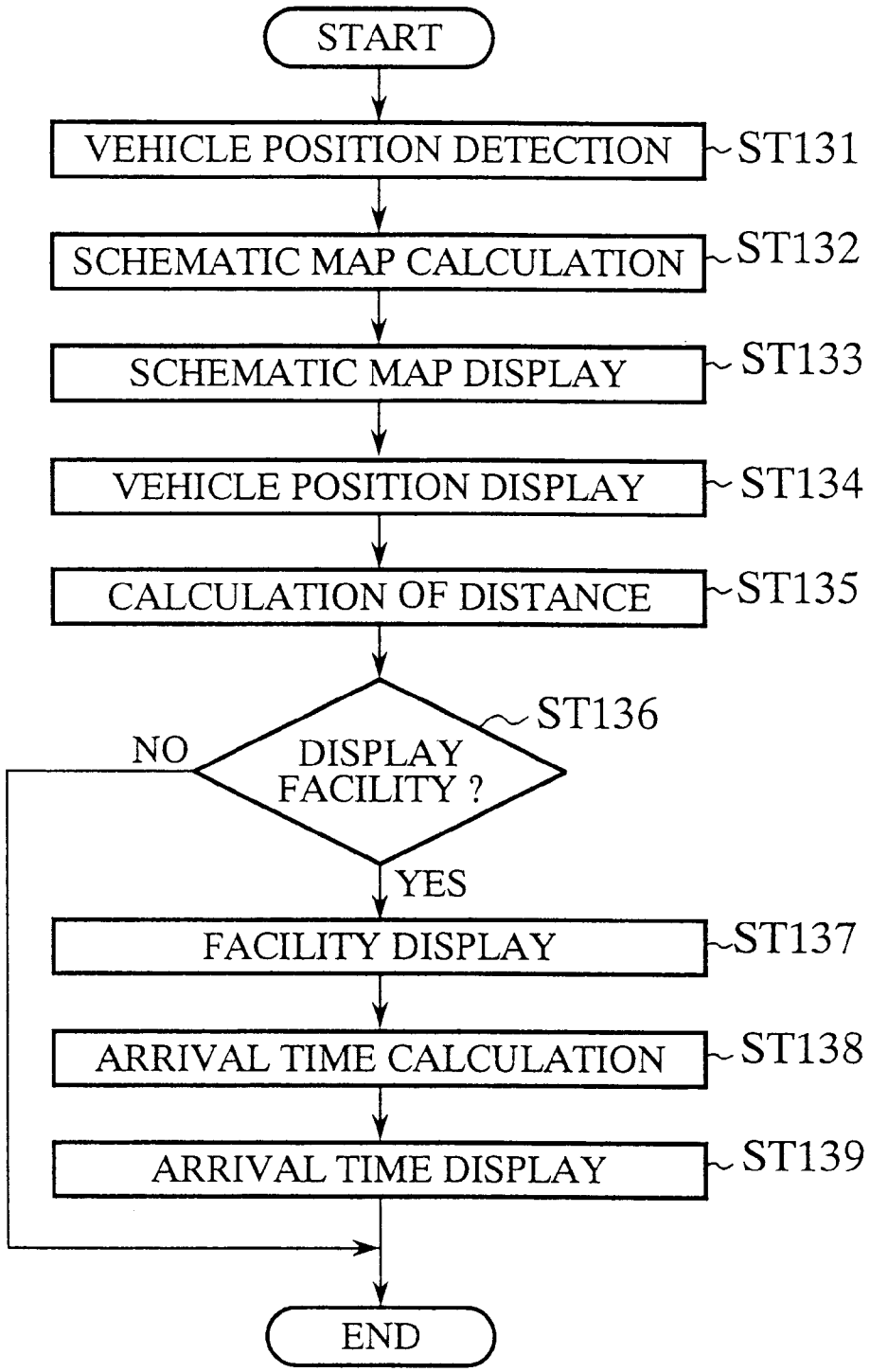
FIG. 21 is a flow chart showing the operation of a vehicle navigation device according to a sixth embodiment of the present invention as shown in FIG. 20.

FIG. 21 is a flowchart showing the operation of the vehicle navigation device according to the sixth embodiment as shown in FIG. 20. In the flowchart shown in FIG. 21, steps ST131–137 are the same as the steps ST111–117 in the flowchart showing the operation of the vehicle navigation device according to the first embodiment shown in FIG. 3 and so will not be explained here.

Next in a step ST138, on the basis of traffic information such as information concerning traffic congestion supplied from the outside and road speed limits on the road between the vehicle position and the facility B, the arrival time calculation device 12 calculates the average speed and the arrival time using the average speed and the trip from the vehicle position P to the facility B.

Next in a step ST139, the calculation result calculated by the arrival time calculation device 12 is displayed on a schematic map displayed on the display section 9.

Figure 22:
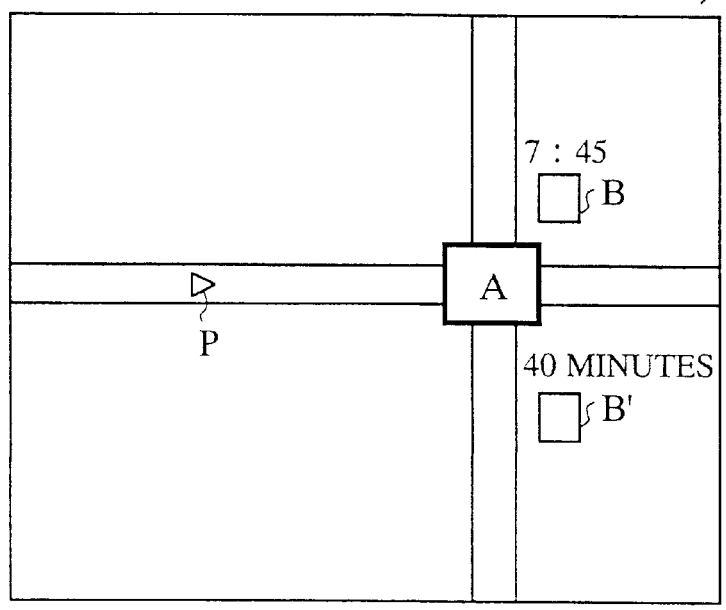
FIG. 22 is an explanatory diagram showing an example of an estimated time being displayed on a schematic map.

FIG. 22 is an explanatory diagram showing an example of an arrival time displayed on a schematic map.

In the example shown in FIG. 22, the position of the vehicle P is set as the arbitrary geographical point and a road map is displayed in a plan form.

The vehicle position P and the facility B are shown on this schematic road map. Furthermore since the arrival time from the vehicle position to the facility B is integrally displayed, it is possible to understand more accurately the information about the route to the facility B in the vicinity of the road intersection point A. When the operator desires information about this facility, it is possible to obtain more detailed information about the facility B by touching the screen where the facility is displayed on the crystal display.

As shown by the reference symbol B' in FIG. 22, the arrival time calculation section 12 calculates the required time B' (trip time) to arrive at the facility from the vehicle position. Furthermore it may be displayed on the schematic map displayed on the display section 9 under the control of the display control section 8. Furthermore the required time for the vehicle to arrive at the facility may be calculated from the road intersection point A, rather than the present position P of the vehicle and displayed on the display section 9.

In the explanation of embodiments 1–5 of the vehicle navigation device, selection of the facilities has been performed based on the distance to the facility. However it is possible to perform selection of the facility based on the length of the arrival time as in embodiment 6.

As shown above, according to embodiment 6, the arrival time calculation device calculates the arrival time from the present position of the vehicle to a facility and displays the result on the schematic map displayed on the display device 9. In this way, the operator can more accurately and easily understand information regarding the route to the facility in the vicinity of the road intersection point. Furthermore when the operator desires information about this facility, by touching the screen of the display section, for example the crystal display, where the facility is displayed it is possible to quickly and easily obtain more detailed information about the facility.

Embodiment 7

Figure 23:
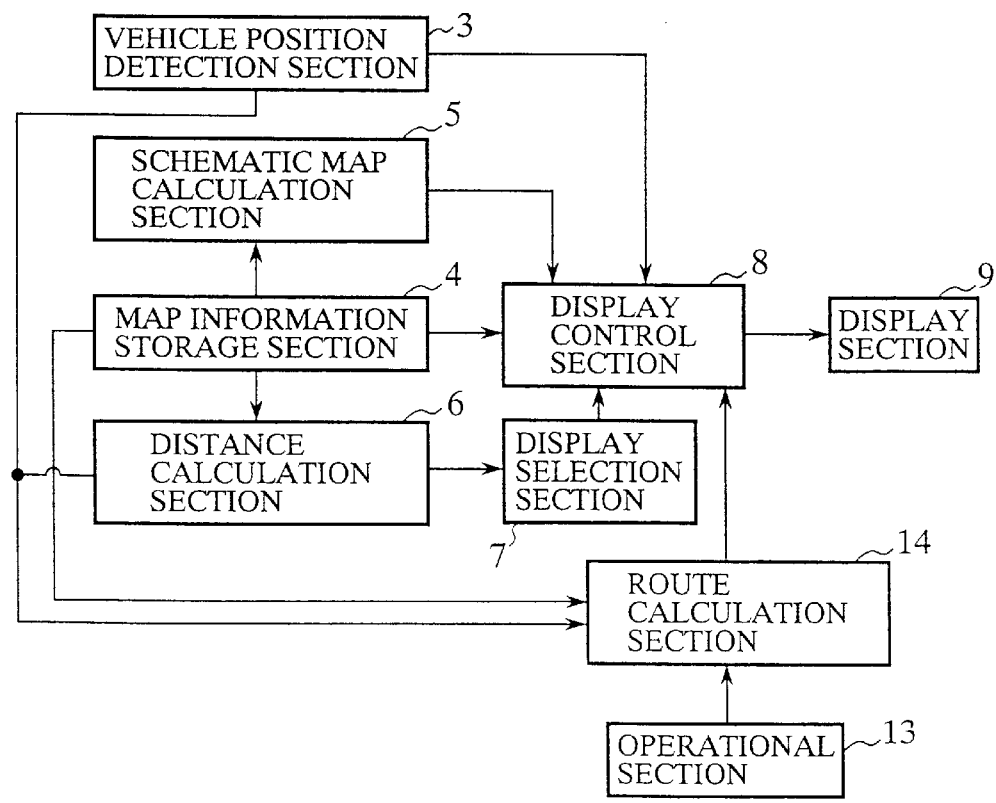
FIG. 23 is a block diagram showing a vehicle navigation device according to seventh embodiment of the present invention.

FIG. 23 is a block diagram showing embodiment 7 of the vehicle navigation device of the present invention. In the figure, 13 is an operational section by which the operator can designate facilities on the schematic map displayed on the display section 9. 14 is a route calculation section for calculating the vehicle position P detected by the vehicle position detecting section 3 and the route to the designated facility from the vehicle position P on the basis of data sent from the map information storage section 4.

In the vehicle navigation device according to embodiment 7, the route calculation section 14 calculates the distance on the route to a facility designated by the operator 13 and displays it on a schematic map displayed on the display section 9.

Next the operation of the invention will be explained.

Figure 24:
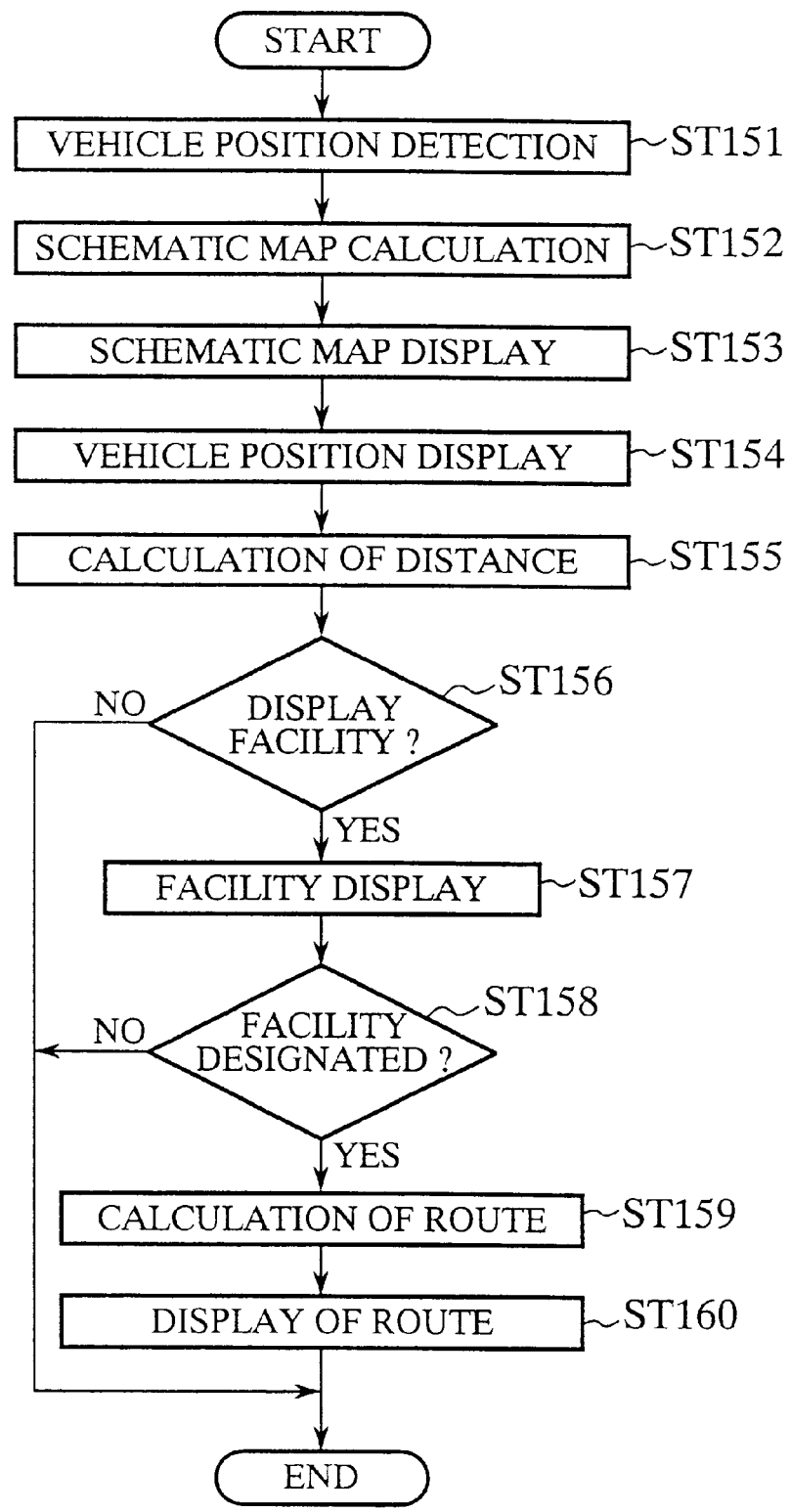
FIG. 24 is a flow chart showing the operation of a vehicle navigation device according to a seventh embodiment of the present invention as shown in FIG. 23.

FIG. 24 is a flowchart showing the operation of a vehicle navigation device according to embodiment 7 of the present invention as shown in FIG. 23. In the flowchart shown in FIG. 24, since steps ST 151–157 are the same as steps ST 111–117 in the flowchart showing the operation of the vehicle navigation device according to embodiment 5 of the present invention as shown in FIG. 18, they will not be explained again here.

When it is desired to display a route to a facility B on a schematic map displayed on a display section 9, in a step ST 158, the operator operates the operational section 13 (for example remote control, touch panel operation, voice command or the like) and designates a facility B displayed on the schematic map.

Then in a step ST 159, the route calculation section 14 calculates the vehicle position P detected by the vehicle position detection section 3 and route to the designated facility B from the current position of the vehicle P based on data obtained from the map information storage section 4.

Then in a step ST 160, the route obtained by the calculation in a step ST 159 is displayed on the schematic map displayed on the display section 9.

Figure 25:
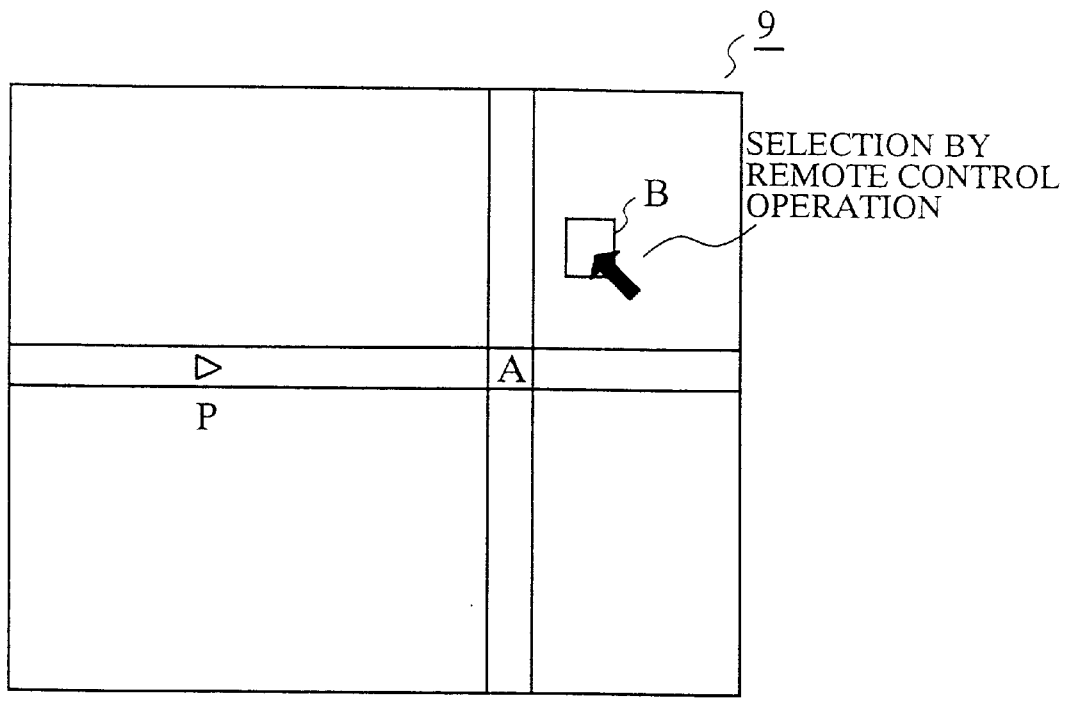
FIG. 25 and FIG. 26 are explanatory diagrams showing an example of a route being displayed on a display section.
Figure 26:
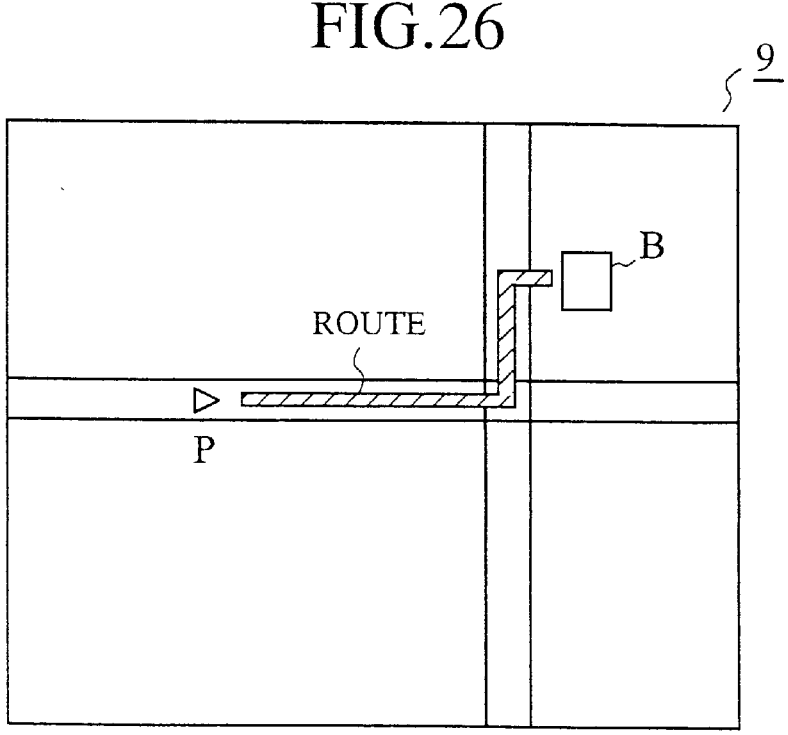

FIGS. 25 and 26 are explanatory diagrams showing examples of the route displayed on the display section 9.

As shown in the schematic map shown in FIG. 25, the arbitrary geographical point is set as the vehicle position P and the vehicle position P and the facility B is displayed on the schematic map. At this time when the operator selects the facility B by operation of remote control or the like, as shown in FIG. 26, since the route from the vehicle position P to the facility B is displayed on the schematic map, the operator can easily understand the route to the facility.

In the explanation of the vehicle navigation device according to embodiments 6 and 7 of the present invention, the arbitrary geographical point was set as the vehicle position, however the invention is not so limited and for example the arbitrary geographical point could be set as an interchange (IC), a road intersection or the like.

As above according to embodiment 7 of the present invention, the route calculation section 14 calculates the route distance to a designated facility by the operator using the operations section 13. Since the route to the facility is displayed on the schematic map displayed on the display section 9, the route to the facility is easily understood by the operator.

Embodiment 8

In the navigation device in the first embodiment of the invention having the structure shown in FIGS. 1–6, it is possible to display a gasoline stand (GS) on the schematic map by making the facility selected on the display selection section 7 a gasoline stand (GS). The eighth embodiment of the present invention allows the operator using the display selection means 7 to select a gasoline stand (GS) as a facility and display the gasoline stand (GS) on the schematic map.

The operation of the invention will now be explained.

Figure 27:
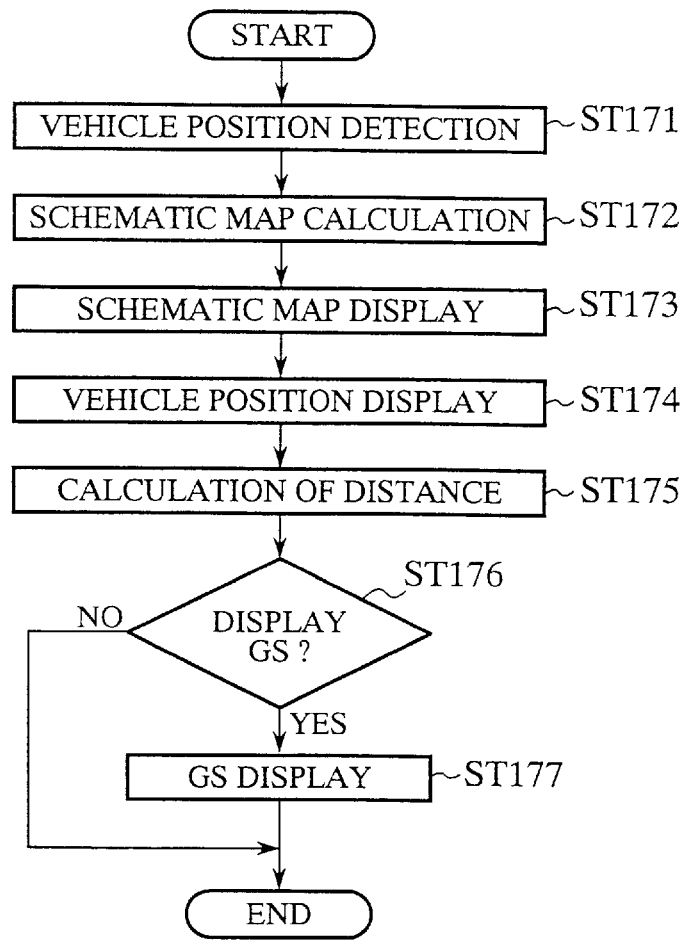
FIG. 27 is a flow chart showing the operation of a vehicle navigation device according to a eighth embodiment of the present invention.

FIG. 27 is a flowchart showing the operation of the vehicle navigation device according to an eighth embodiment of the present invention. In the flowchart shown in FIG. 27, steps ST 171–175 are the same as steps ST 31–35 in the flowchart showing the operation of the first embodiment of the invention as shown in FIG. 3 and will not be explained again here.

In the explanation below, the arbitrary geographical point is taken to be road intersection point A.

First in a step ST 176, when it is desired to display the closest gasoline stand (GS) B of the facilities near to a road intersection A, the operator selects the gasoline stand (GS) B using the display selection device 7.

Then in a step ST 177, the gasoline stand (GS) B is displayed on the schematic map displayed on the display section 9 as a facility selected by the operator.

Figure 28:
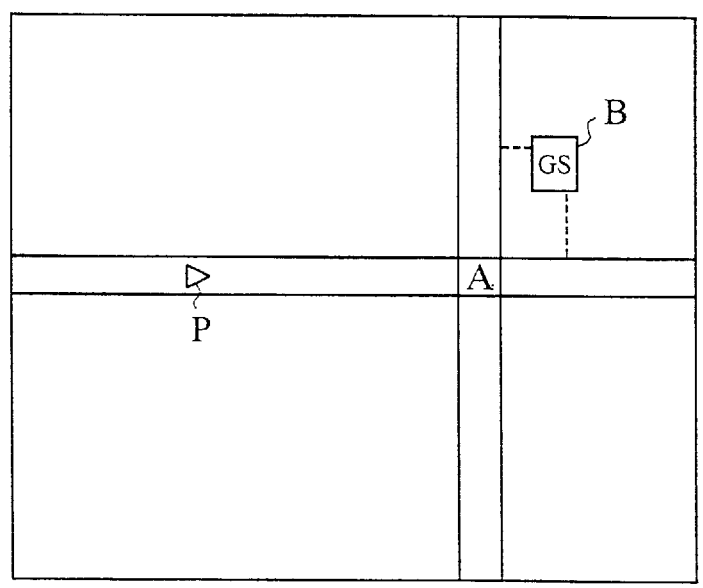
FIG. 28 is an explanatory diagram showing an example of a gasoline stand on a schematic map being displayed on a display section.

FIG. 28 is an explanatory diagram of an example showing the gasoline stand (GS) B is displayed on the schematic map displayed on the display section 9. As above, the operator selects the gasoline stand (GS) B using the display selection section 7 and the gasoline stand (GS) B is displayed on the schematic map. Furthermore as shown in FIG. 28 a road by which it is possible to enter the gasoline stand (GS) B is shown by a dotted line.

As shown above according to embodiment 8, when the arbitrary geographical point is taken to be a road intersection A, the operator may select a the gasoline stand (GS) using a display selection section 7. Since the display section 9 displays the vehicle position P and the gasoline stand (GS), the operator can easily understand information relating to the gasoline stand (GS) in proximity to the intersection.

Embodiment 9

In the vehicle navigation device according to the first embodiment which has the arrangement as shown in FIGS. 1–6, it is possible to display a parking area on the schematic map by making the facility selected on the display selection section 7 a parking area. The navigation device according to the ninth embodiment of the present invention allows the operator to select a parking area as a facility using the display selection section 7 and display a parking area on the schematic map.

Next the operation of the invention will be explained.

Figure 29:
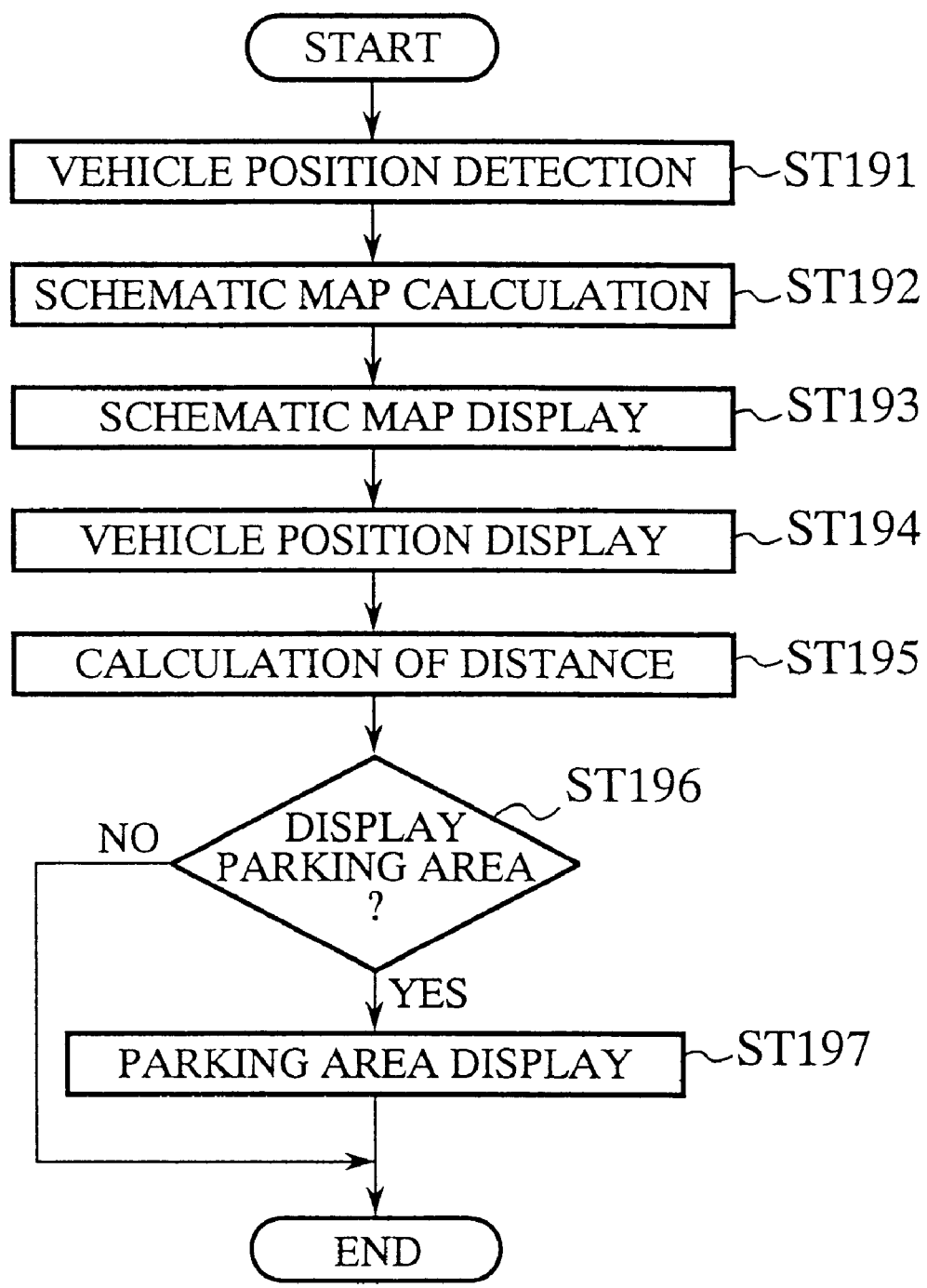
FIG. 29 is a flow chart showing the operation of a vehicle navigation device according to a ninth embodiment of the present invention.

FIG. 29 shows a flowchart of the operation of the vehicle navigation device according to a ninth embodiment of the present invention. In the flowchart shown in FIG. 29, steps ST 191–195 are the same as steps ST 31–35 in the flowchart showing the operation of the vehicle navigation device according to the first embodiment as shown in FIG. 3 and so will not be explained again here.

In the explanation below, the arbitrary geographical point is taken to be the road intersection A.

In a step ST 196, when it is desired to display a proximate parking area of those facilities that are in proximity to the road intersection point A on the schematic map, the operator selects the parking area B using the display selection section 7.

Then in a step ST 197, the parking area B is selected by the operator as a facility and displayed on the schematic map displayed on the display section 9.

Figure 30:
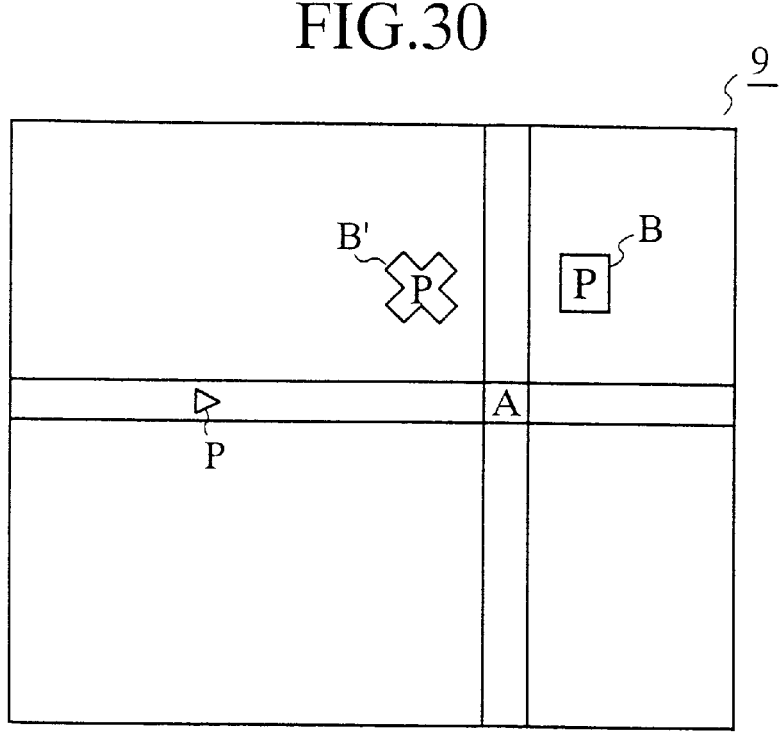
FIG. 30 is an explanatory diagram showing an example of a parking area on a schematic map being displayed on a display section.

FIG. 30 is an explanatory diagram which shows an example of a parking area displayed in the display section 9 on a schematic map. In this way, the operator selects a parking area B using a display selection section 7 and displays the parking area B on the schematic map. Furthermore when the parking area is full, the information that the parking area is full may be conveyed to the driver by displaying it on the schematic map in the form parking area B'. In this case, the information that the parking area is full may be obtained from outside based on traffic broadcasts.

As above according to embodiment 9, when the arbitrary geographical point is taken to be a road intersection point, if the driver selects a parking area using the display selection section 7, since the display section 9 displays the vehicle position P and the parking area on the schematic map, the operator can easily understand information relating to a parking area in the vicinity of an intersection.

Embodiment 10

In the first embodiment of the present invention having the arrangement as shown in FIGS. 1–6, it is possible to display a shop on the schematic map by making the facility selected by the display selection section 7 a shop such as a convenience store, a supermarket or a home center. The vehicle navigation device according to embodiment 10 of the present invention allows the operator to select a shop as a facility by using the display selection section 7 and displaying the shop on the schematic map.

Next the operation of the invention will be explained.

Figure 31:
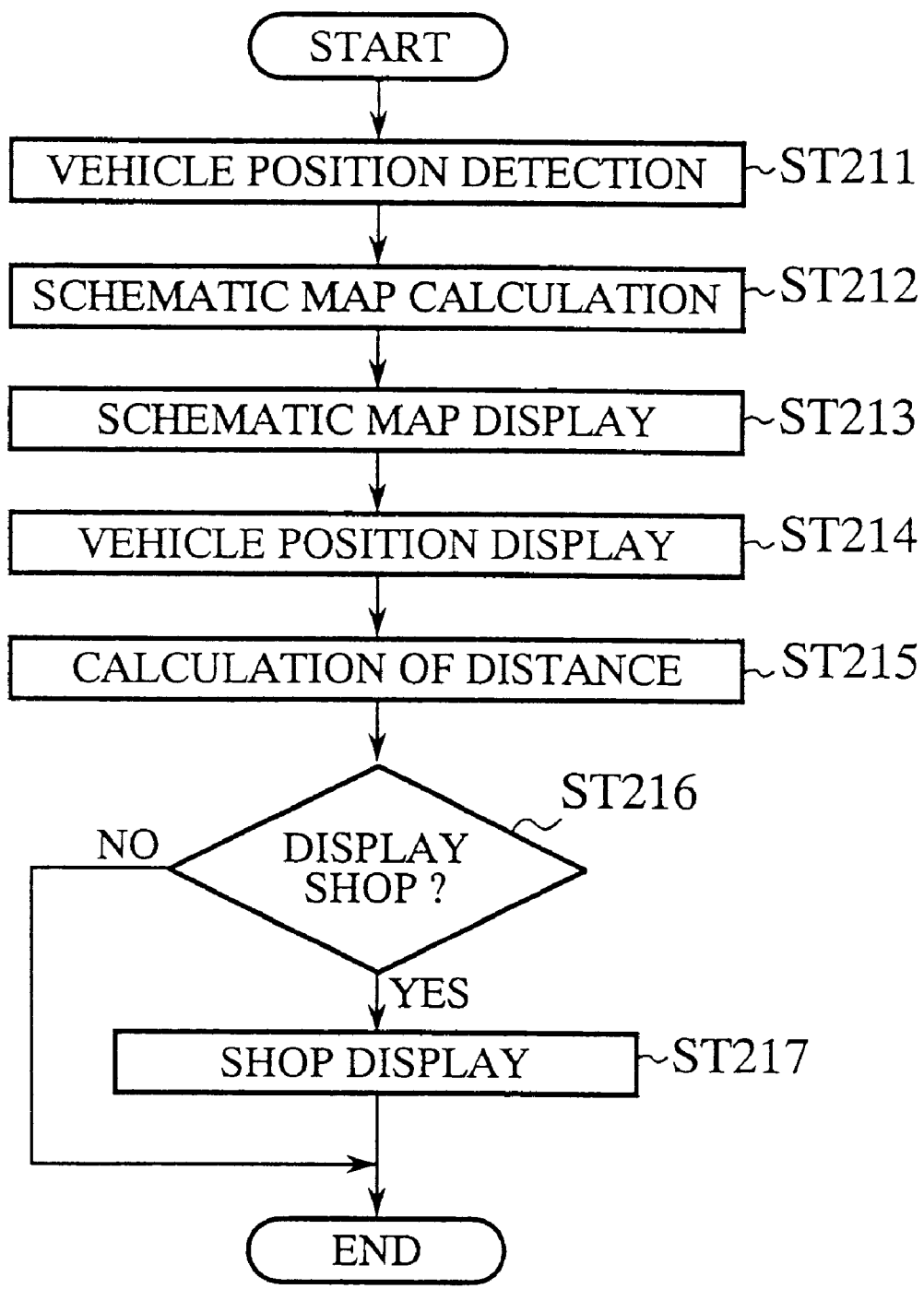
FIG. 31 is a flow chart showing the operation of a vehicle navigation device according to a tenth embodiment of the present invention.

FIG. 31 is a flowchart showing the operation of a vehicle navigation device according to embodiment 10 of the present invention. In the flowchart shown in FIG. 31, steps ST 211–215 are the same as steps ST 31–35 in the flowchart showing the operation of the vehicle navigation device according to embodiment 1 of the present invention and will not be explained again here.

In a step ST 216, when it is desired to display a nearby shop B to the facilities in proximity to the intersection A (for example a convenience store) on the schematic map displayed on the display section 9, the operator may select a shop B using the display selection section 7.

Then in a step ST 217, a shop B is displayed on the schematic map displayed on the display section 9 as a facility selected by the operator.

Figure 32:
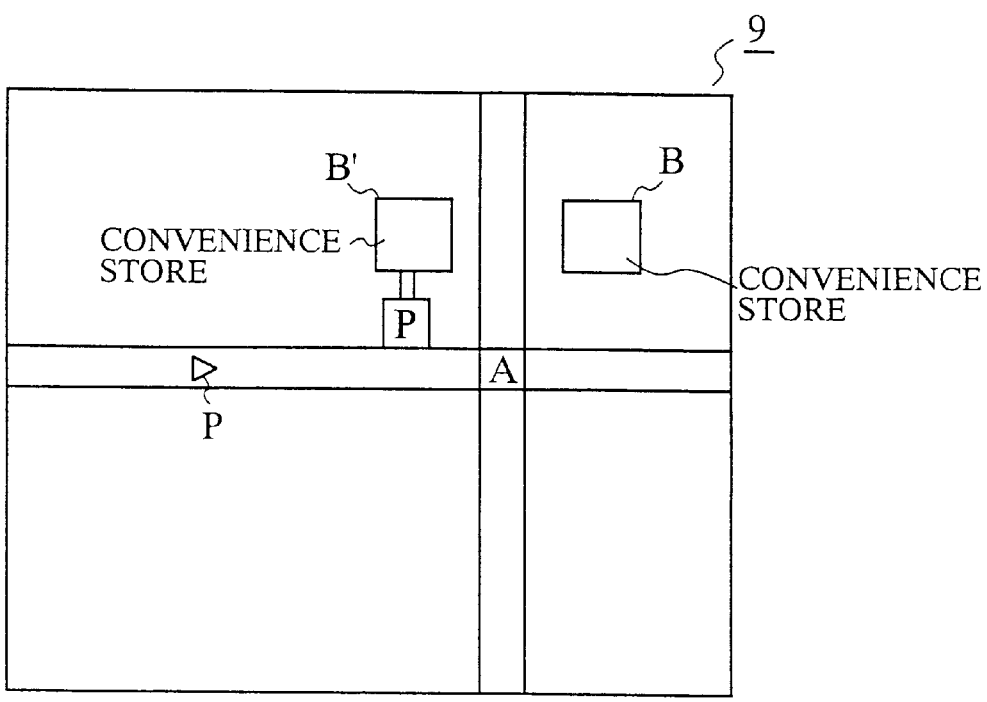
FIG. 32 is an explanatory diagram showing an example of a shop on a schematic map being displayed on a display section.

FIG. 32 is an explanatory diagram of an example of a shop B (for example a convenience store) displayed on a schematic map displayed on a display section 9. In this way, the operator can display a shop B on the schematic map by selecting the shop B by using the display selection section 7. Furthermore it is possible to display the relationship between the shop B which may be a convenience store and an attached parking area by using double lines on the schematic map displayed on the display section 9 (refer to reference symbol B' in FIG. 32).

As shown above, according to embodiment 10 when the arbitrary geographical point is set as a road intersection point A, if the operator selects a shop using the display selection section 7, since the display section 9 displays the vehicle position A and the shop B (for example a convenience store or the like) in proximity to the intersection A on the schematic map, the operator can easily and accurately understand information relating to the shop in proximity to the road intersection A.

Embodiment 11

In the vehicle navigation device according to the first embodiment having the arrangement shown in FIGS. 1–6, it is possible to display a restaurant on the schematic map by making the facility selected on the display selection section 7 a restaurant (a family restaurant, fast food, coffee shop or the like). The vehicle navigation device according to embodiment 11 of the present invention allows the operator to select a restaurant as a facility using the display selection device 7 and display the restaurant on the schematic map.

Next the operation of the invention will be explained.

Figure 33:
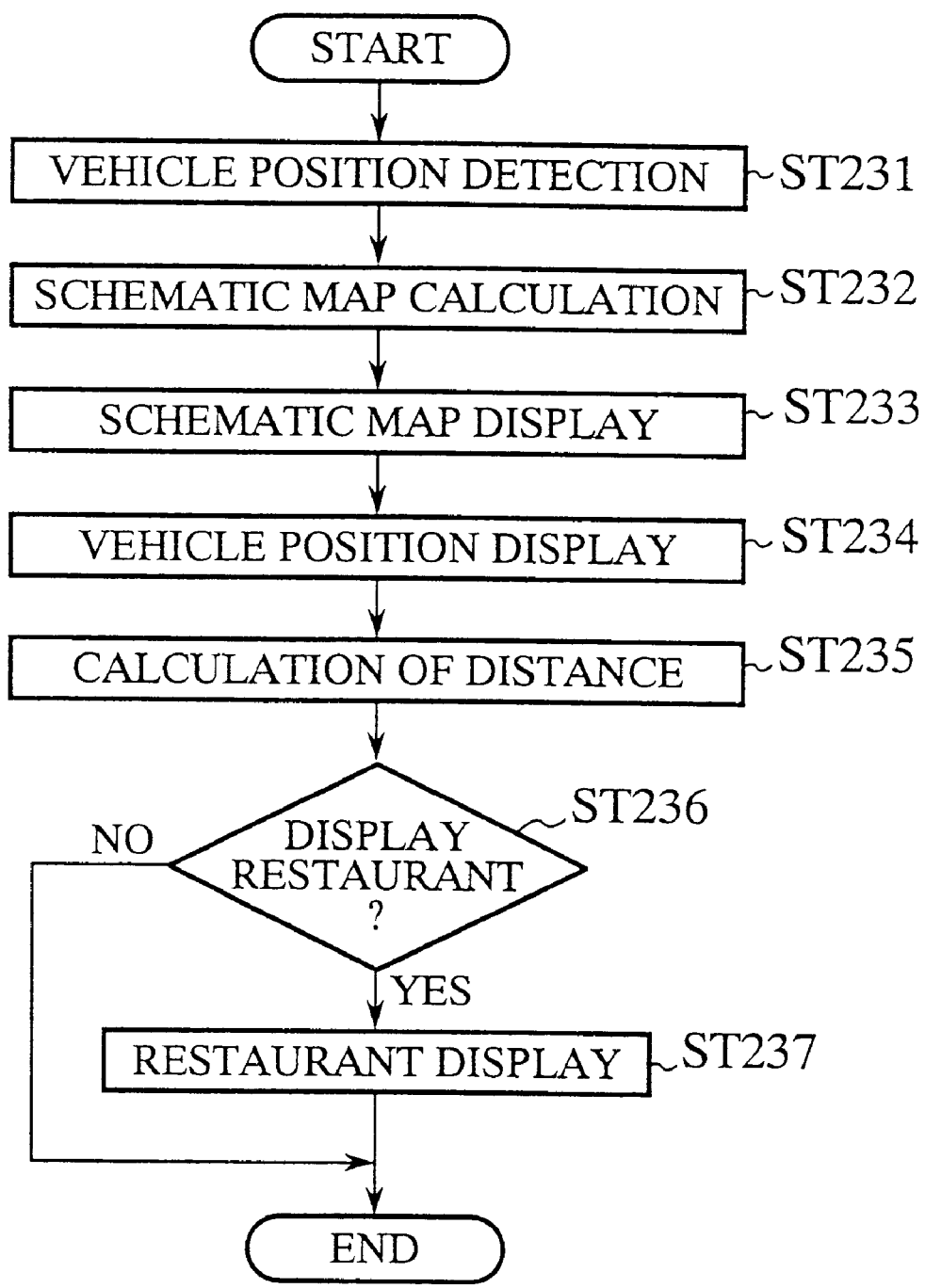
FIG. 33 is a flow chart showing the operation of a vehicle navigation device according to an eleventh embodiment of the present invention.

FIG. 33 is a flowchart showing the operation of the vehicle navigation device according to embodiment 11 of the present invention. In the flowchart shown in FIG. 33, steps ST 231–235 are the same as steps ST 31–35 in the flowchart showing the operation of the vehicle navigation device in the first embodiment in FIG. 3 and will not be explained again here.

In a step ST 236, when it is desired to display a restaurant B (for example a family restaurant, a fast food restaurant or a coffee shop) which is in proximity to facilities near a road intersection point A on a schematic map displayed on a display section 9, the operator selects a restaurant B using a display selection section 7.

In a step ST 237, a restaurant B is displayed as a facility selected by the operator on the schematic map displayed on the display section 9.

Figure 34:
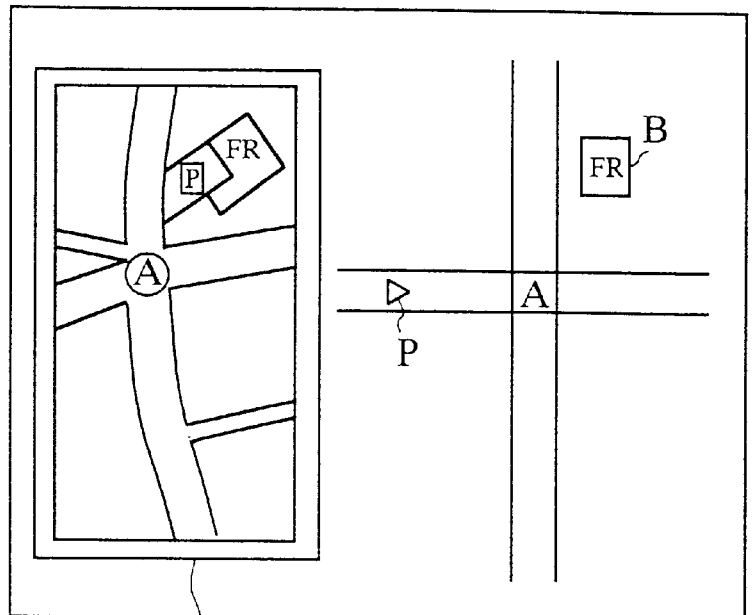
FIG. 34 is an explanatory diagram showing an example of a restaurant on a schematic map being displayed on a display section.

FIG. 34 is an explanatory diagram showing an example of a shop B (for example a family restaurant) displayed on a schematic map displayed on a display section 9. In this way, an operator displays a restaurant B on the schematic map by selecting the restaurant B using the display selection device 7. As shown in the subscreen 91 in FIG. 32, it is possible to display an enlarged map of the road intersection and surroundings simultaneously.

As shown above, according to embodiment 11 of the present invention, by setting the arbitrary geographical point a road intersection A, if the operator selects a restaurant using the display selection section 7, since the display section 9 displays the vehicle position P and the restaurant B (for example a family restaurant or the like) in proximity of the road intersection A on the schematic map, the operator can easily and accurately understand the information relating to the restaurant in the proximity of the road intersection A.

Embodiment 12

In the vehicle navigation device of the first embodiment which has the arrangement FIGS. 1–6, it is possible to display leisure facilities on the schematic map by making the facility which is selected on the display selection section 7 a leisure facility (such as a bowling alley, game center or the like). The vehicle navigation device of embodiment 12 allows the operator to select leisure facilities as a facility and display the leisure facilities on the schematic map using the display selection section 7.

Next the operation of the device will be explained.

Figure 35:
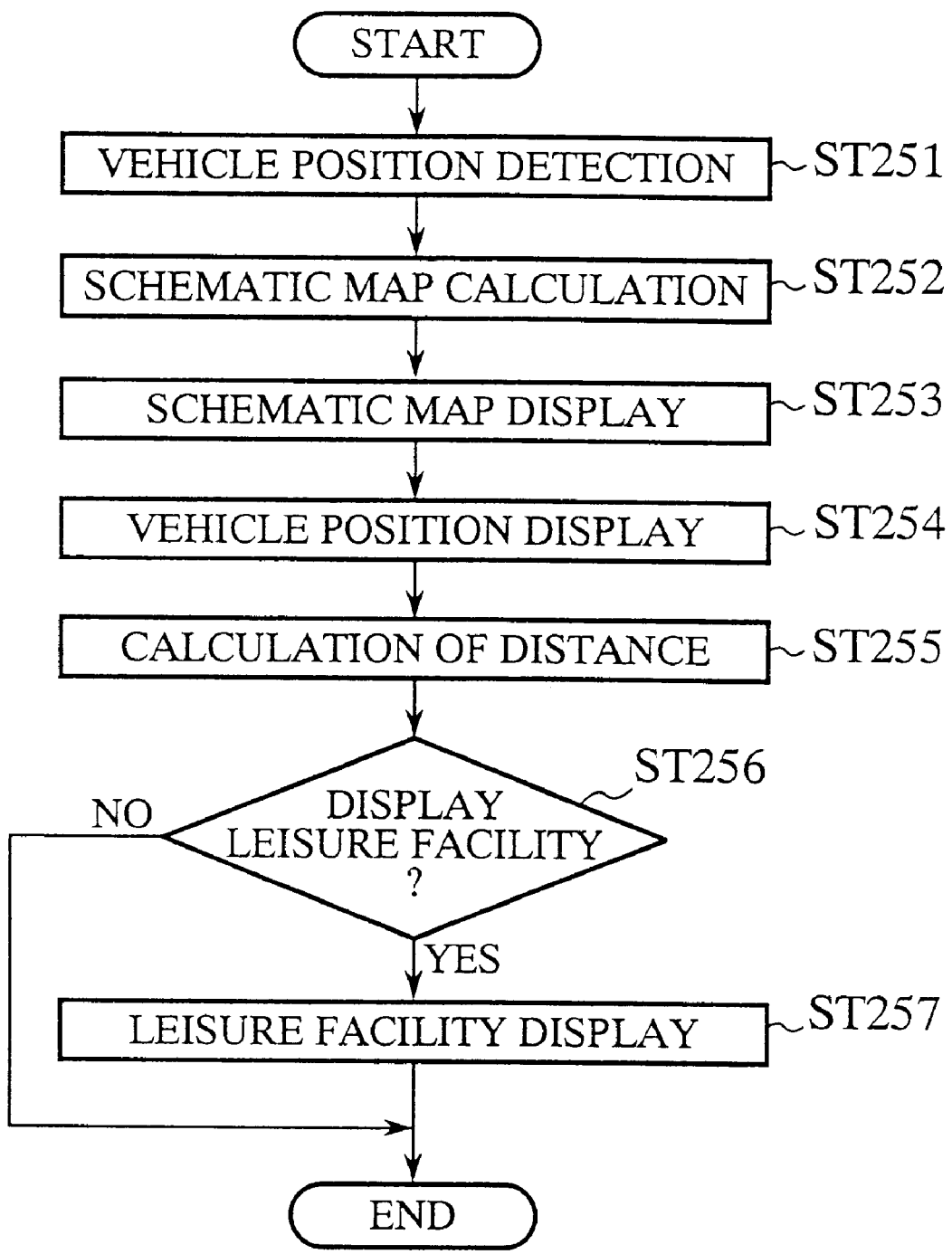
FIG. 35 is a flow chart showing the operation of a vehicle navigation device according to a twelfth embodiment of the present invention.

FIG. 35 is a flowchart showing the operation of a vehicle navigation device according to embodiment 12. In the flowchart in FIG. 35, since steps ST 251–255 are the same as steps ST 31–35 in the flowchart showing the operation of the vehicle navigation device according to the first embodiment shown in FIG. 3, their explanation will not be repeated here.

In a step ST 256, when it is desired to display a leisure facility B (for example a bowling alley, game center or the like) which is proximate to the facilities in the vicinity of road intersection point A on a schematic map displayed on a display section 9, the operator selects the leisure facility B using display selection section 7.

Then in a step ST 257, the leisure facility B is displayed on the schematic map displayed on the display section 9 as a facility selected by the operator.

Figure 36:
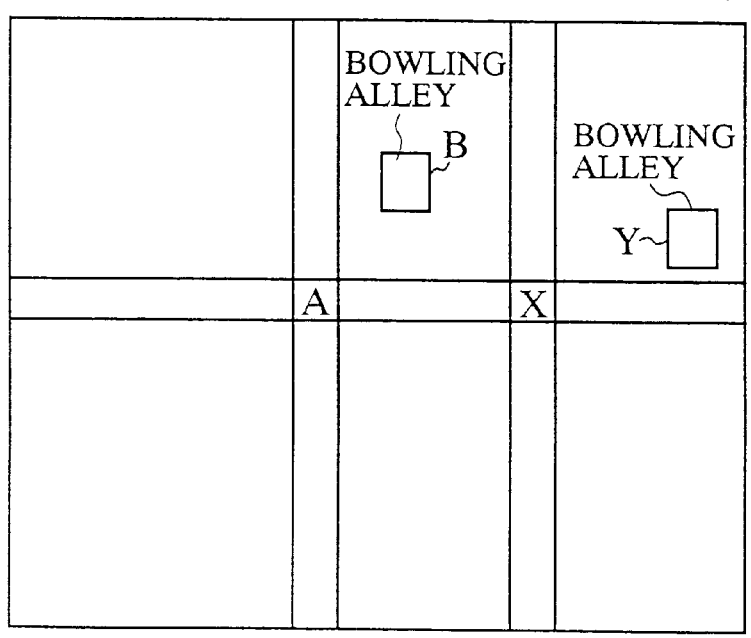
FIG. 36 is an explanatory diagram showing an example of leisure facilities on a schematic map being displayed on a display section.

FIG. 36 is an explanatory diagram showing an example of leisure facilities B displayed on a schematic map displayed on a display section 9. In this way, the operator can display leisure facilities B on the schematic map by selecting the leisure facilities B using the display selection section 7.

Thus it is possible to display another intersection X existing on the schematic map and another leisure facility Y (the bowling alley in FIG. 36) existing in the vicinity of the intersection at the same time.

In FIG. 36, there is no mark indicating the present position of the vehicle P on the displayed road because the present position of the vehicle is on the road (for example when running on a municipal road) which is not adjacent to the displayed road.

As shown above, according to embodiment 12 of the present invention, when an intersection A is made the arbitrary geographical point, and the operator selects leisure facilities using the display selection section 7, since the display section 9 displays the leisure facilities in the vicinity of an intersection A on the schematic map, the operator can easily and accurately understand information related to leisure facilities in the vicinity of a road intersection point A.

Embodiment 13

In a vehicle navigation device according to a first embodiment having the arrangement as shown in FIGS. 1–6, it is possible to display "station street" on the schematic map by making the facility selected by the display selection section 7 a station.

The vehicle navigation device according to embodiment 13 allows an operator to select a station street as a facility using the display selection section 7 and display the station street on the schematic map.

Next the operation of the invention will be explained.

Figure 37:
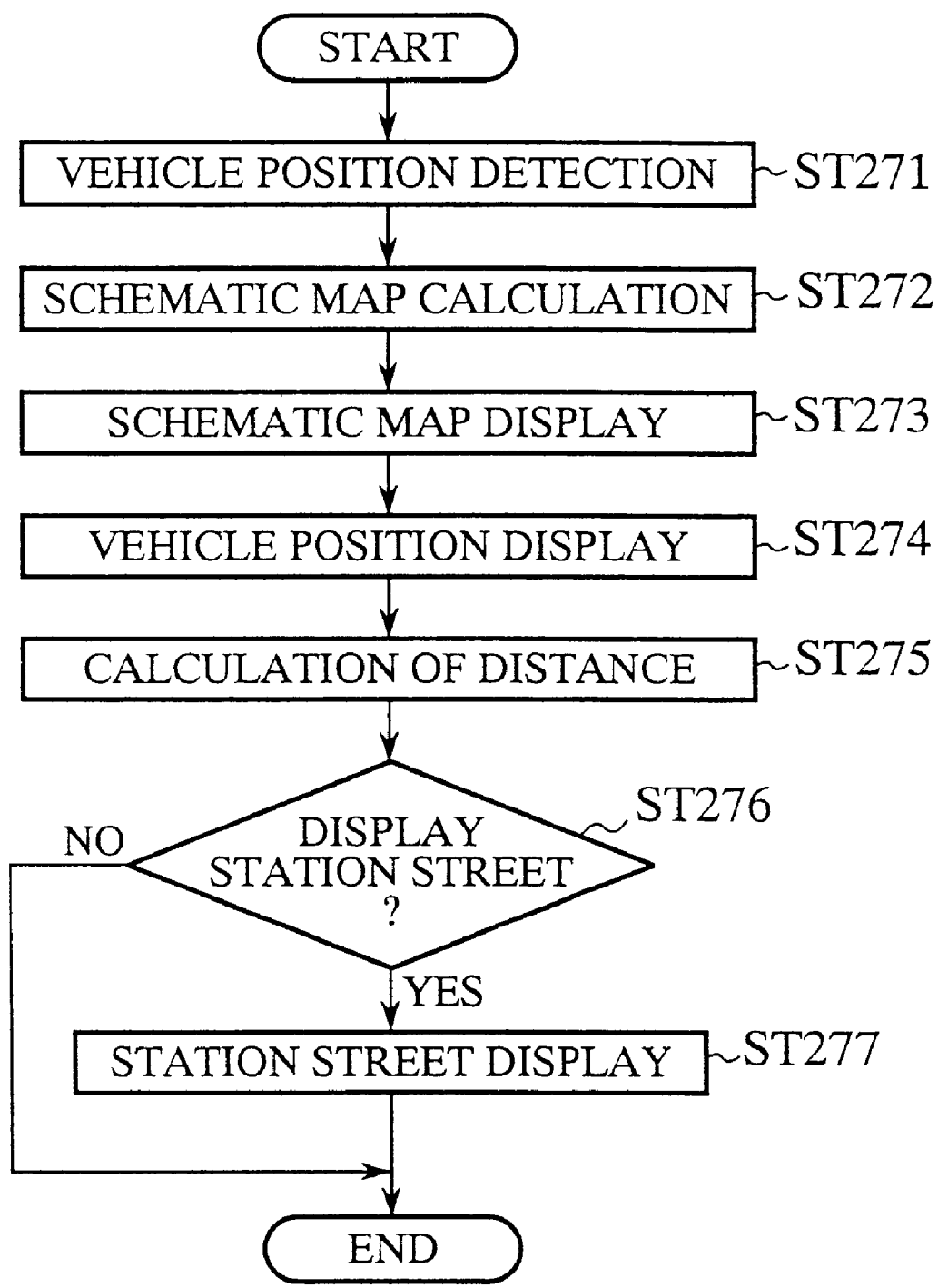
FIG. 37 is a flow chart showing the operation of a vehicle navigation device according to a thirteenth embodiment of the present invention.

FIG. 37 is a flowchart showing the operation of the vehicle navigation device according to embodiment 13. In the flowchart in FIG. 37, since steps ST 271–275 are the same as steps ST 31–35 in the flowchart showing the operation of the vehicle navigation device according to the first embodiment shown in FIG. 3, their explanation will not be repeated here.

In a step ST 276, when it is desired to display a station street B which is in proximity to the facilities in the vicinity of the road intersection point A on the schematic map displayed on the display section 9, the operator selects the station street B using the display selection section 7.

Then in a step ST 257, the station street is displayed on the schematic map displayed on the display section 9 as a facility selected by the operator.

Figure 38:
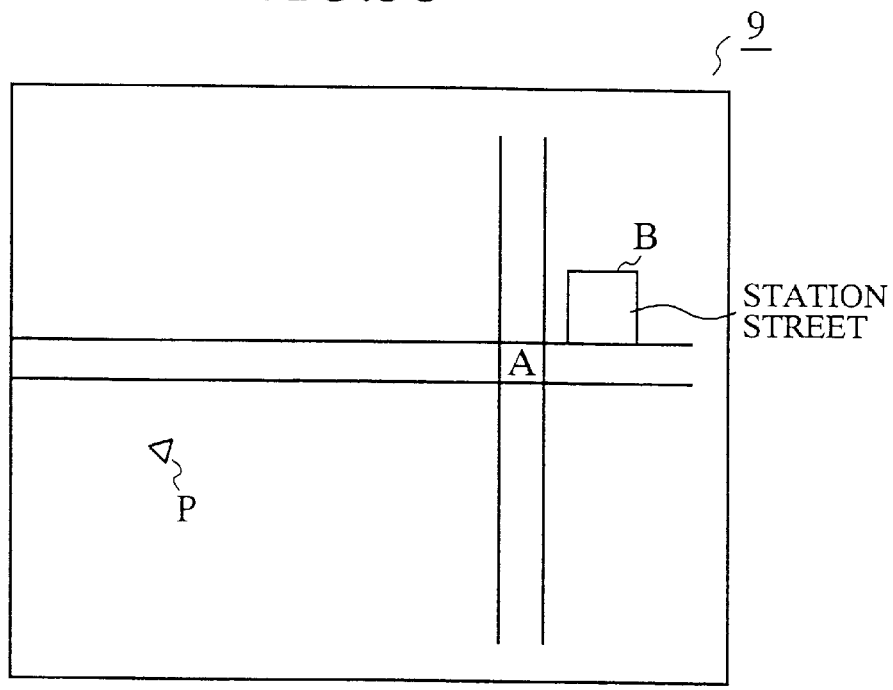
FIG. 38 is an explanatory diagram showing an example of a railway station on a schematic map being displayed on a display section.
Figure 39:
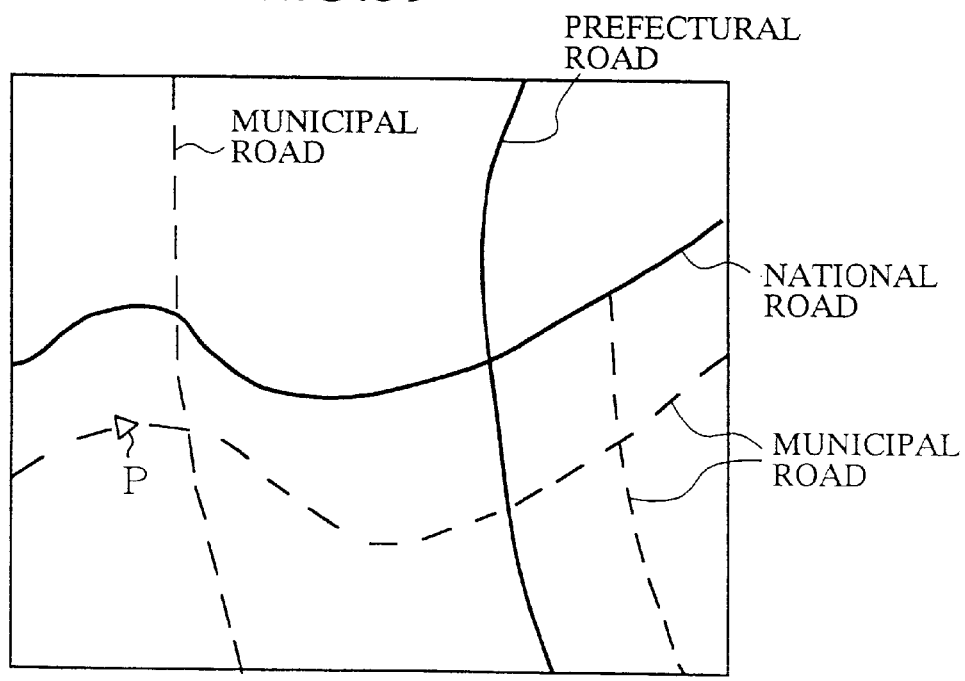
FIG. 39 is an explanatory diagram showing a map which forms the basis of the schematic map shown in FIG. 38.

FIG. 38 shows an example of indicating a station street B on a schematic map shown on a display section 9. In this way, the operator can indicate the station street B on schematic map by selecting the station street B using a display selector section 7. Furthermore in the schematic map shown in FIG. 38, there is a mark indicating the present position of the vehicle on the outside of the street. However this is because as shown in FIG. 39, the present position of the vehicle is on a municipal road shown by the broken line rather than on a national road shown by a solid line.

As shown above, according to embodiment 13 of the present invention, when the arbitrary geographical point is set as a road intersection point A, and the operator selects the station street using the display selection section 7, the display section 9 will display the station street and since the present position of the vehicle in the vicinity of road intersection point A on the schematic map, the operator can easily and quickly understand information relating to a station street in the vicinity to road intersection A.

Embodiment 14

Figure 40:
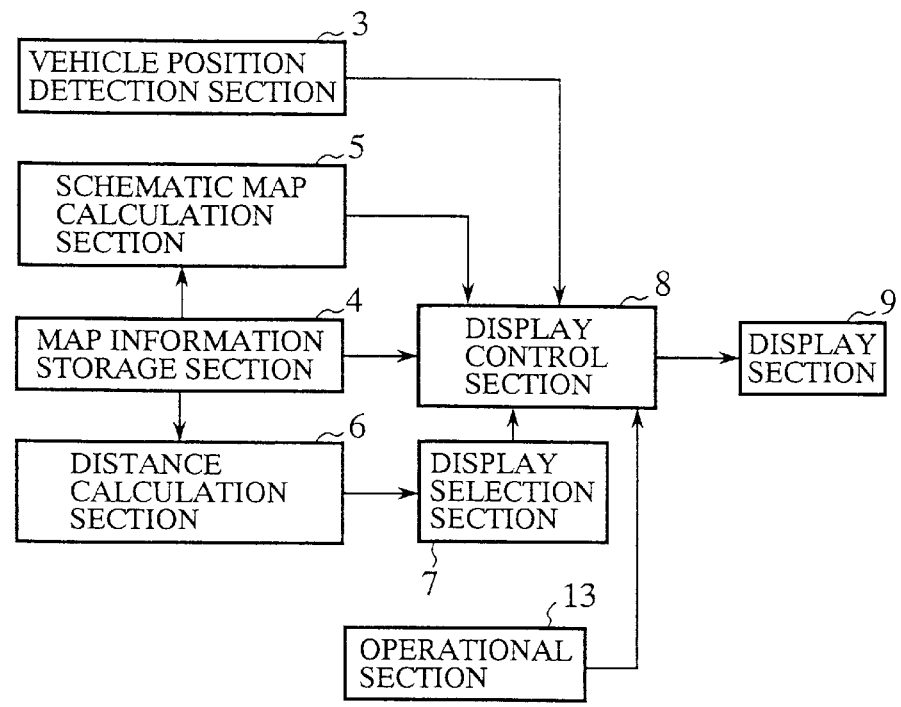
FIG. 40 is a block diagram showing of a vehicle navigation device according to fourteenth embodiment of the present invention.

FIG. 40 is a block diagram showing a vehicle navigation device according to embodiment 14 of the present invention. In the figure, 13 is an operational section which selects categories of facilities displayed on the schematic map from items which are categorized beforehand as convenience stores, supermarkets, fast-food stores etc. The operational section 13 is the same as that shown in embodiment 7 of the vehicle navigation system as shown in FIG. 23. Other components are the same as those in embodiment 1 of the vehicle navigation system and will not be explained here.

In a vehicle navigation device according to embodiment 14, facilities which can be selected on the schematic map displayed on the display section 9 are displayed on a selection menu. The operator can display selected facilities on the schematic map by selecting desired facilities from those facilities on the selection display menu using the operational section 13.

Next the operation of the invention will be explained.

Figure 41:
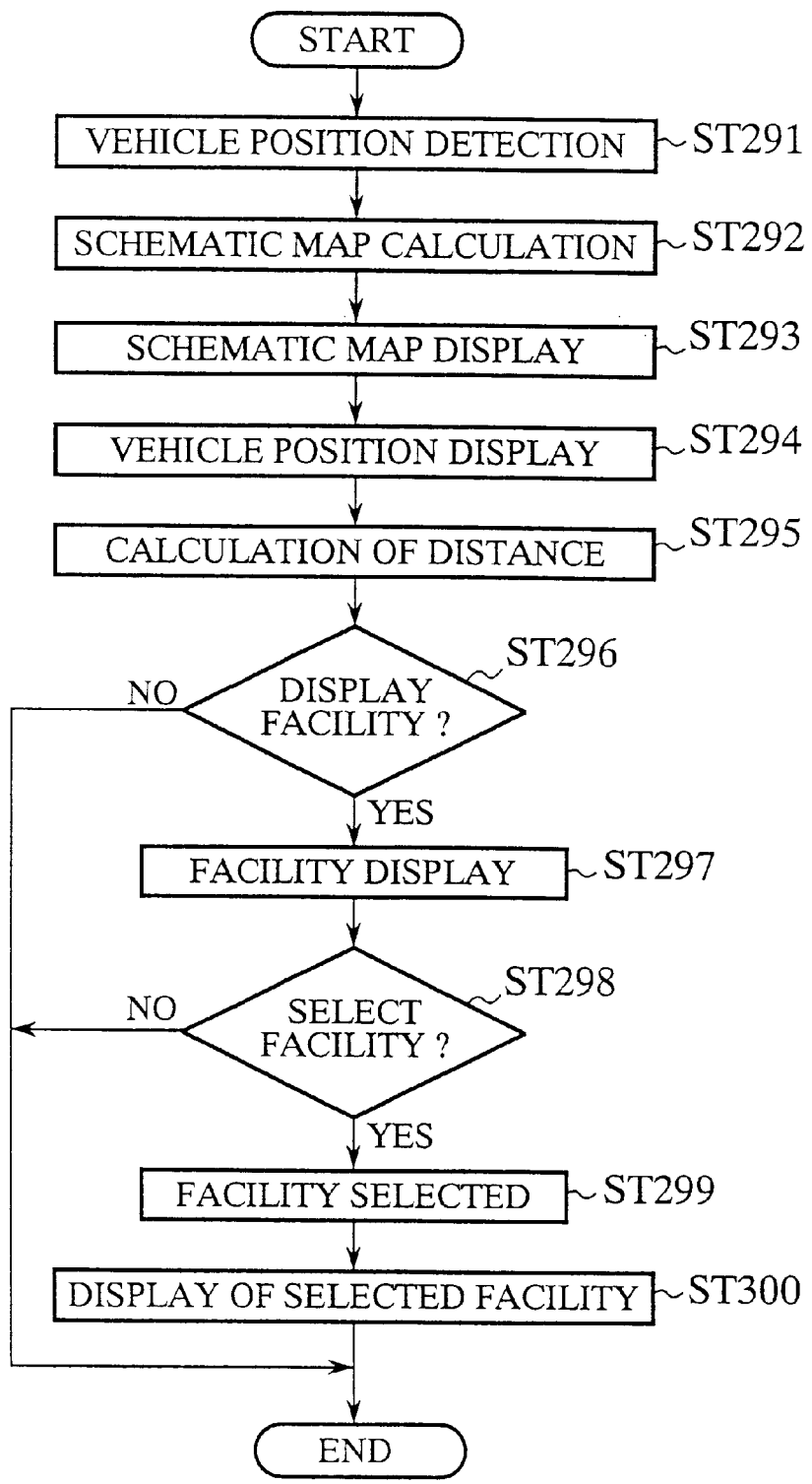
FIG. 41 is a flow chart showing the operation of a vehicle navigation device according to a fourteenth embodiment of the present invention.

FIG. 41 is a flowchart showing the operation of a vehicle navigation device according to embodiment 14 as shown in FIG. 40. In the flowchart shown in FIG. 41, steps ST 291–295 are the same as steps ST 31–37 in the flowchart showing the operation of the vehicle navigation device according to embodiment 1 as shown in FIG. 3 and will not be explained again here.

In a step ST298, the operator selects a facility which is displayed on a schematic map on the display section 9. The operator depresses the facility category selection key by operating the operational section 13 (remote control, touch panel operation, voice commands etc) and displays the selection menu of the facility.

Then in a step ST299, the operator selects for example a convenience store from among the items which are categorized beforehand as convenience stores, supermarkets, fast-food stores etc on the selection menu screen.

Then in a step ST 300, only the convenience store selected in step ST299 is displayed on schematic map displayed on the display section 9.

Figure 42:
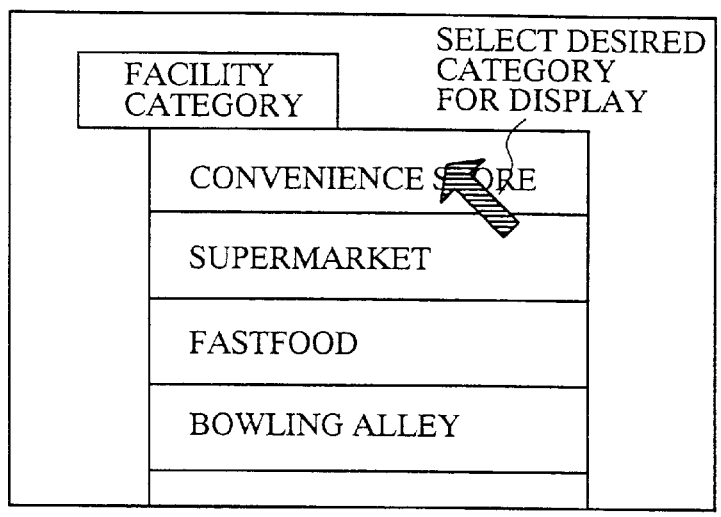
FIG. 42 is an explanatory diagram showing an example of a selection menu screen used in order to select facilities.
Figure 43:
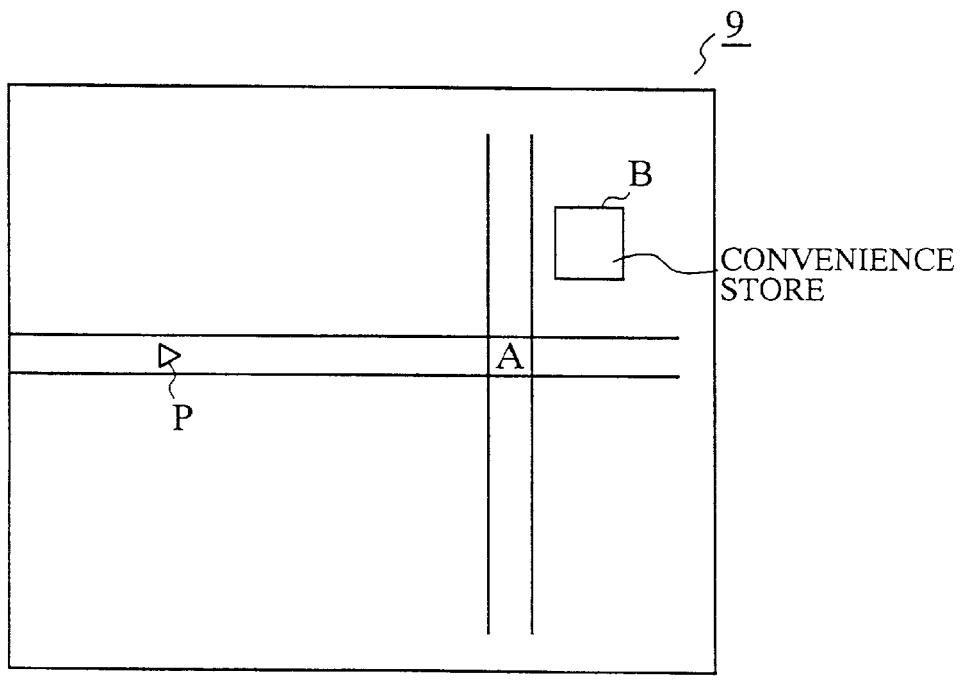
FIG. 43 is an explanatory diagram showing an example of a display on a schematic map of facilities selected on the selection menu screen.

FIG. 42 is an explanatory figure showing a display example of a selection menu screen for selecting facilities. FIG. 43 is an explanatory figure showing a display example of a facility selected on a selection menu screen and displayed on a schematic map.

For example in the selection menu screen in FIG. 42, when the operator selects a convenience store from the facility category items, as shown in FIG. 43, it is possible to display a convenience store B on the schematic map displayed on the display section 9. In this way, it is possible to display the facility category which is desired to be displayed on the schematic map.

As above, according to embodiment 14 of the present invention, since selected facilities are displayed on the schematic map displayed on the display section 9 by selecting a desired facility from among the facilities displayed on the menu, the operator by using the operational section 13, can easily and quickly understand the facilities which are desired to display on the schematic map.

Embodiment 15

Figure 44:
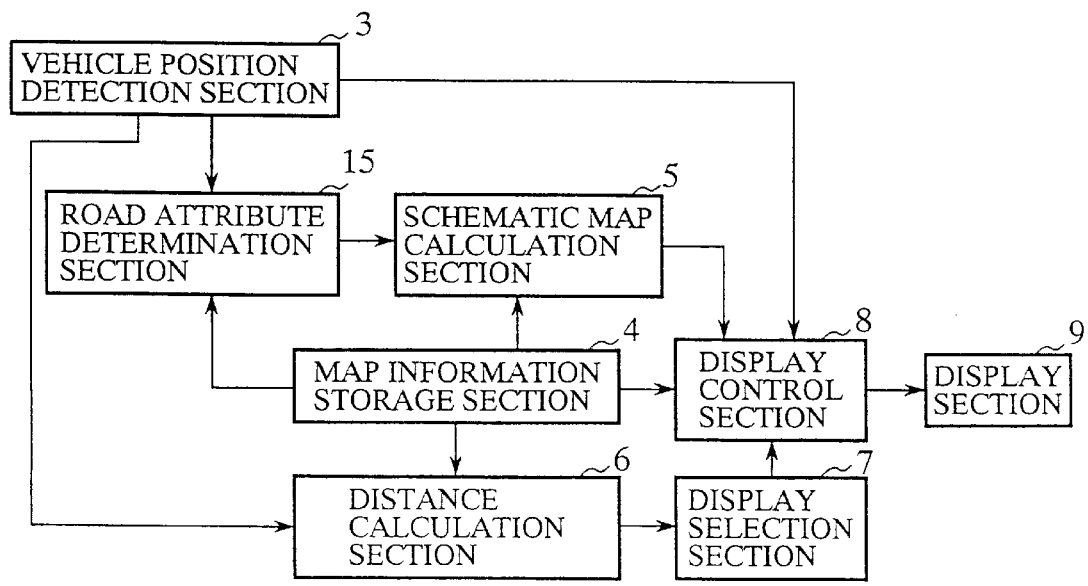
FIG. 44 is a block diagram showing of a vehicle navigation device according to fifteenth embodiment of the present invention.

FIG. 44 is a block diagram which shows a vehicle navigation device according to embodiment 15 of the present invention. In the figure, 15 is a road attribute determination section which determines the attributes of roads based on data stored in the map information storage section 4 and the present position P of the vehicle obtained from the vehicle position detection section 3. Other components are the same as those in the first embodiment of the vehicle navigation device and will not be explained again here.

The vehicle navigation device according to embodiment 15 of the present invention performs a determination of whether the road on which the vehicle is presently running an automobile-only road (expressway or tollway) or a general road (national road, prefectural road or municipal road) and supplies that information to the operator on the schematic map.

Next the operation of the invention will be explained.

Figure 45:
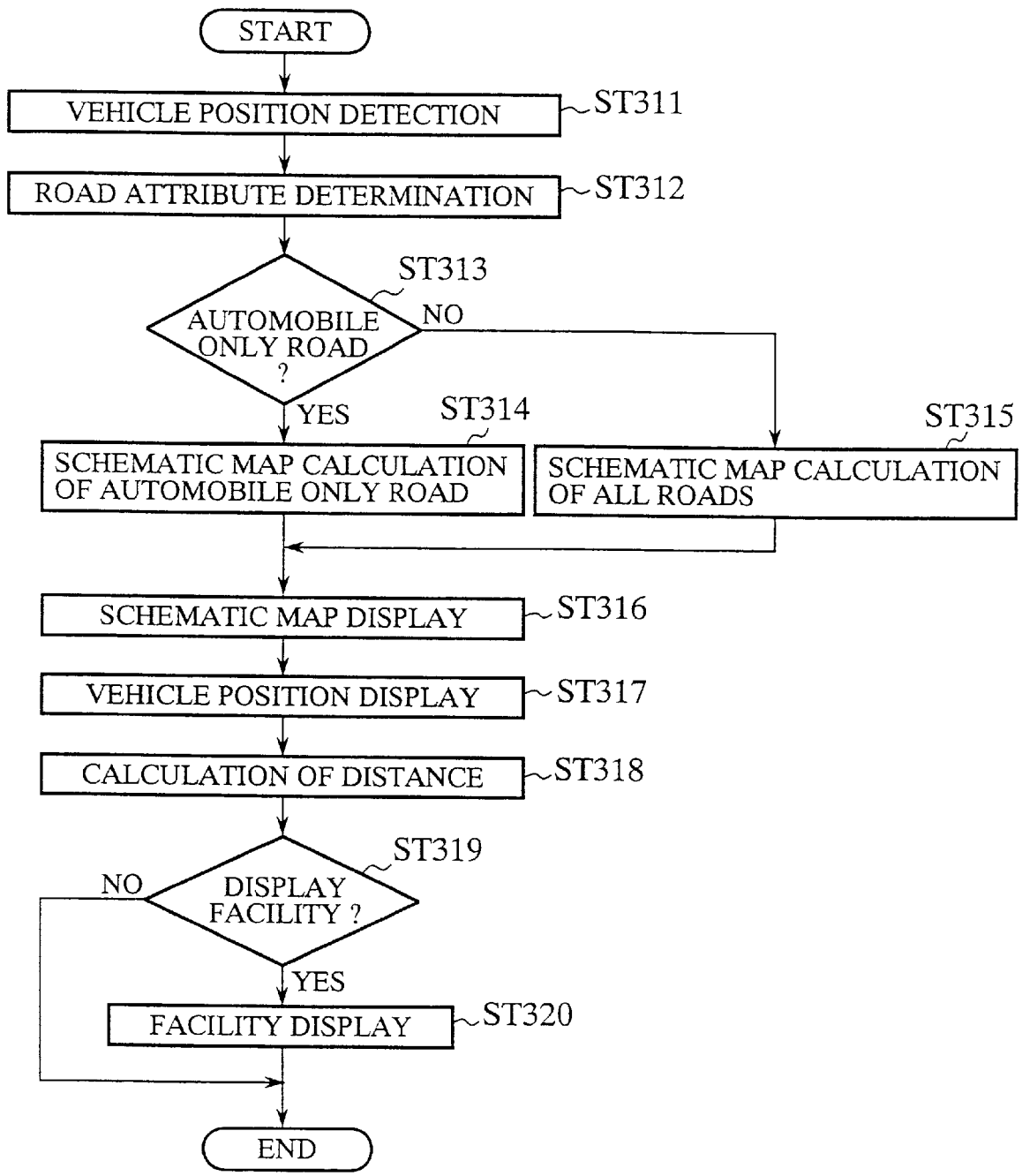
FIG. 45 is a flow chart showing the operation of a vehicle navigation device according to a fifteenth embodiment of the present invention.

FIG. 45 is a flowchart showing the operation of the vehicle navigation device according to embodiment 15 shown in FIG. 44. In the flowchart shown in FIG. 45, step ST 311 is the same as step ST 31 in the flowchart showing the operation of the vehicle navigation device according to embodiment 1 and will not be explained again.

The explanation below will take a schematic map as showing an automobile only road and the arbitrary geographical point set as the present position of the vehicle.

In a step ST312, the road attribute determination section 15 determines whether the road attribute of the present position of the vehicle is an automobile-only road or a general road based on information stored in map information storage section 4 and the present position P of the vehicle obtained from the vehicle detection section 3.

Then in a step ST 313, when the road attribute is determined by the road attribute determination section 15 to be an automobile-only road, the routine proceeds to a step ST314. In the step ST314, the schematic map calculation section 5 reduces interchanges (IC), junctions (JCT), ramps (R), service areas (SA), parking areas (PA) to schematic form based on automobile-only road data from the map information storage section 4 and reduces the road between those points to a straight line.

Furthermore in the step ST313, when it is determined that the road attributes determined in step ST312 are not automobile-only road, schematic map calculation is performed for all roads in step ST315. This processing performs the same schematic map calculation as in step ST32 in the first embodiment of the invention shown in FIG. 3.

Next in a step ST316, the schematic map calculated in the schematic map calculation section 5 is displayed on the display section 9. In this case, when the road attributes are automobile-only road, only automobile-only roads are displayed on the schematic map.

The following steps ST317–320 are the same as steps 34–37 in the first embodiment as shown in FIG. 3 and will not be explained again here.

Figure 46:
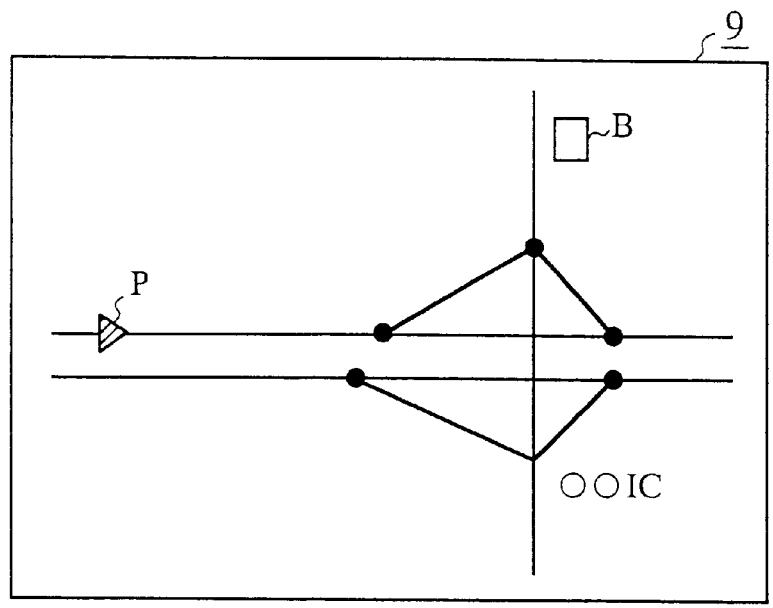
FIG. 46 to FIG. 48 are explanatory diagrams showing an example of displaying facilities and automobile-only roads on a schematic map displayed on a display section.
Figure 47:
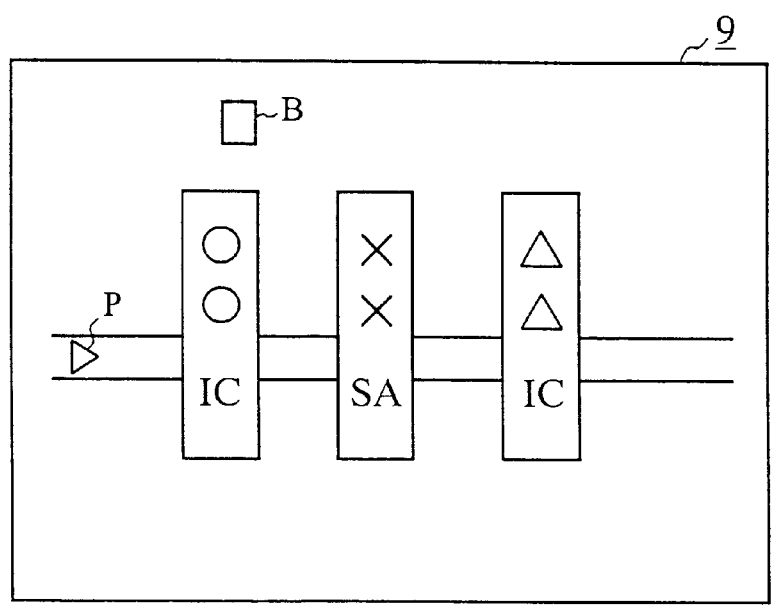
Figure 48:
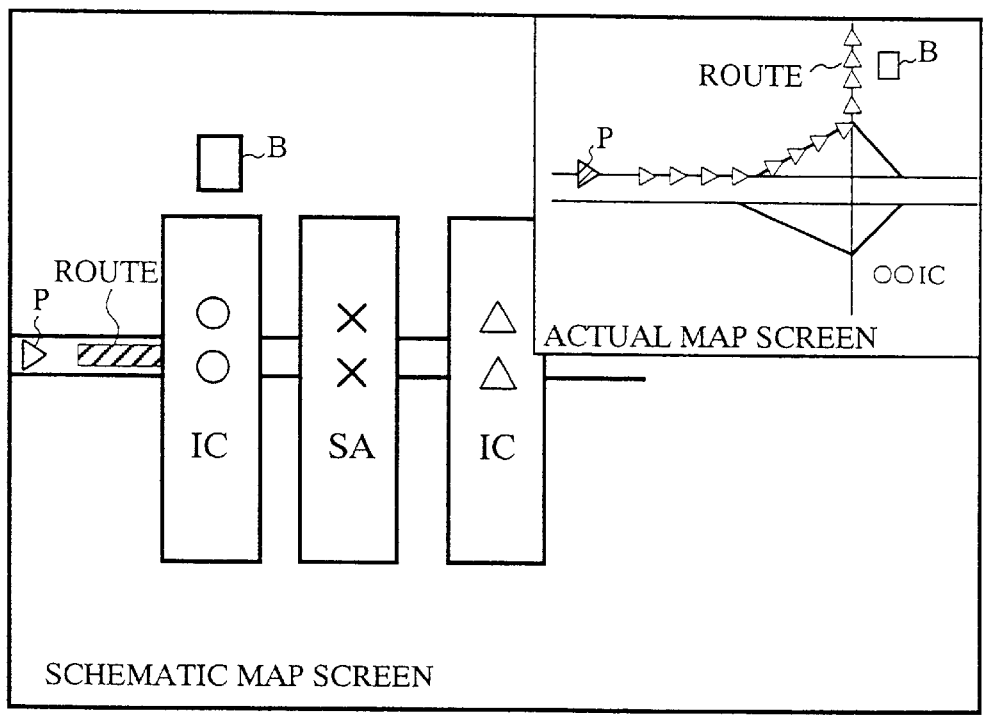

FIGS. 46–48 show an example of a facility an automobile-only road displayed on a schematic map displayed on a display section when the present position P of the vehicle is on an automobile-only road.

As shown in FIG. 46, when the present position P of the vehicle is on an automobile-only road, in the step ST314, the schematic map calculation section 5 reduces interchanges, junctions, ramps, service areas and parking areas to schematic form based on automobile-only road data from the map information storage section 4 and reduces the road between those points to a straight line. The result of the calculation as shown in FIG. 47, is displayed on the display section 9. In FIG. 47, a schematic map with schematized OOIC (interchange), and after that XXSA (service area) and Δ ΔIC (interchange) is displayed on the basis of the automobile-only road on which the vehicle, shown at vehicle position P, is currently travelling.

Furthermore when the arbitrary geographical point is taken to be the vehicle position P and the facility B shown in FIG. 46 is selected so as to be displayed on the schematic map, the display is as shown in FIG. 47.

Furthermore as regards the facility B on the schematic map, when the display of the route is performed as explained in embodiment 7, as shown in FIG. 48, the route (inclinating line section) is shown on the schematic map. Furthermore as shown in the right section of FIG. 48, the route (a plurality of arrows) is shown on the actual map screen. In particular, when the interchange (IC) is displayed, it is possible to confirm what facilities exist in the vicinity of the general road off the expressway before the vehicle leaves the expressway.

In the case of an expressway, it sometimes happens that it is not possible to enter a service area or interchange which is located on the opposite lane. At such times, indication of facilities with respect to those service areas and interchanges may be omitted.

As above, according to embodiment 15 of the present invention, since it is determined by the road attributes determination section 15 whether the road on which the vehicle is currently travelling is an automobile-only road or a general road and since that information is conveyed to the operator, the operator can easily understand the road information.

Embodiment 16

In the first embodiment of a vehicle navigation device having the arrangement as shown in FIGS. 1–6, it is possible to display facilities in the vicinity of an interchange (IC) on a schematic map by setting the interchange (IC) A1, A2, A3 as an arbitrary geographical point. In the vehicle navigation device according to embodiment 16, the operator sets the interchange (IC) A1, A2, A3 as an arbitrary geographical point and displays the facilities in the vicinity of the interchange (IC) A1, A2, A3 on the schematic map.

Next the operation of the invention will be explained.

Figure 49:
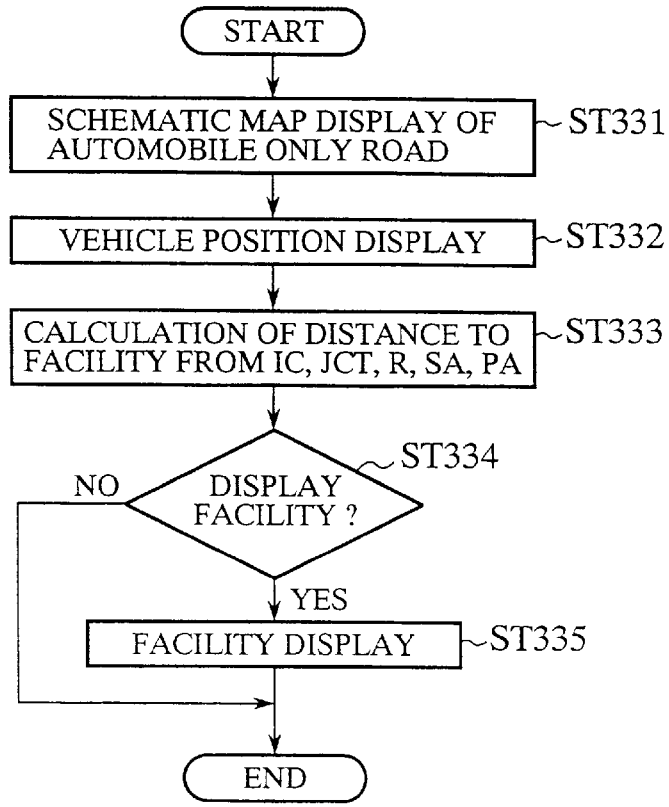
FIG. 49 is a flow chart showing the operation of a vehicle navigation device according to a sixteenth embodiment of the present invention.

FIG. 49 is a flowchart of the operation of a vehicle navigation device according to embodiment 16 of the present invention. Steps ST331–335 are used in place of steps ST316–320 in the flowchart of embodiment 15 shown in FIG. 45. In other respects, the steps are the same and will not be explained again here.

In the explanation below the present position of the automobile is taken to be on an automobile-only road (an expressway).

In a step ST331, since the present position of the vehicle is an automobile-only road, schematic map display is performed with respect to the automobile-only road in a similar manner to steps ST311–314 in embodiment 15 as shown in FIG. 45.

In a step ST 332, the present vehicle position P is displayed on the schematic map displayed on the display section 9.

Then in a step ST333, the distance calculation section 6 calculates the distance from the interchange (IC) A2, A2, A3 to each facility B1, B2, B3.

Then in a step ST334, the display selection determines that facilities having a distance of less than 1 km obtained by the distance calculation section 6 are displayed on the schematic map display.

Then in a step ST335, the display of facility B1 as the facility selected at the facility (interchange (IC) A1) selected by the display selection section 7, the display of facility B2 as the facility selected at interchange (IC) A2, and the display of facility B3 selected at interchange (IC) A3 are displayed on the schematic map displayed on the display section 9.

Figure 50:
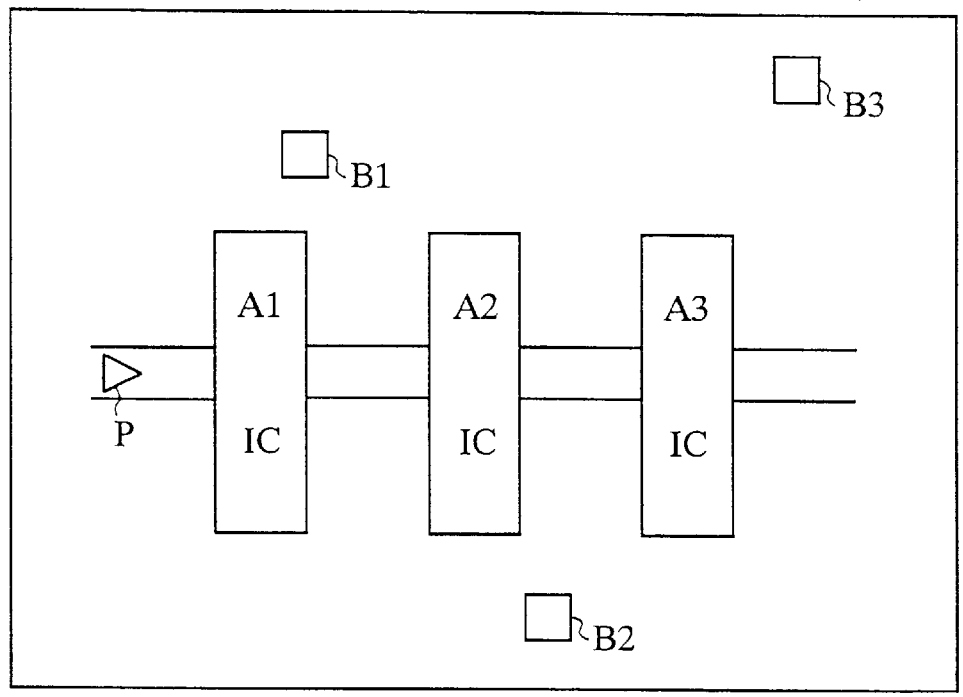
FIG. 50 is an explanatory diagram showing an example of displaying facilities B1, B2, B3 an interchange (IC) on a schematic map.

FIG. 50 is an explanatory diagram showing an example of facilities B1, B2, B3 and an interchange (IC) displayed on a schematic map. In the figure, reference symbol P shows the present position of the vehicle. As shown in FIG. 50, since interchanges (IC) A1, A2, A3 and facilities B1, B2 B3 are displayed on the schematic map, it is easy to understand information related to facilities in the vicinity of the interchange (IC).

As above, according to embodiment 16, it is possible to display facilities in the vicinity of an interchange (IC) on a schematic map by setting the interchange (IC) as the arbitrary geographical point. Thus the operator can obtain information relating to facilities in the vicinity of the interchange (IC) easily on the schematic map.

Embodiment 17

Figure 51:
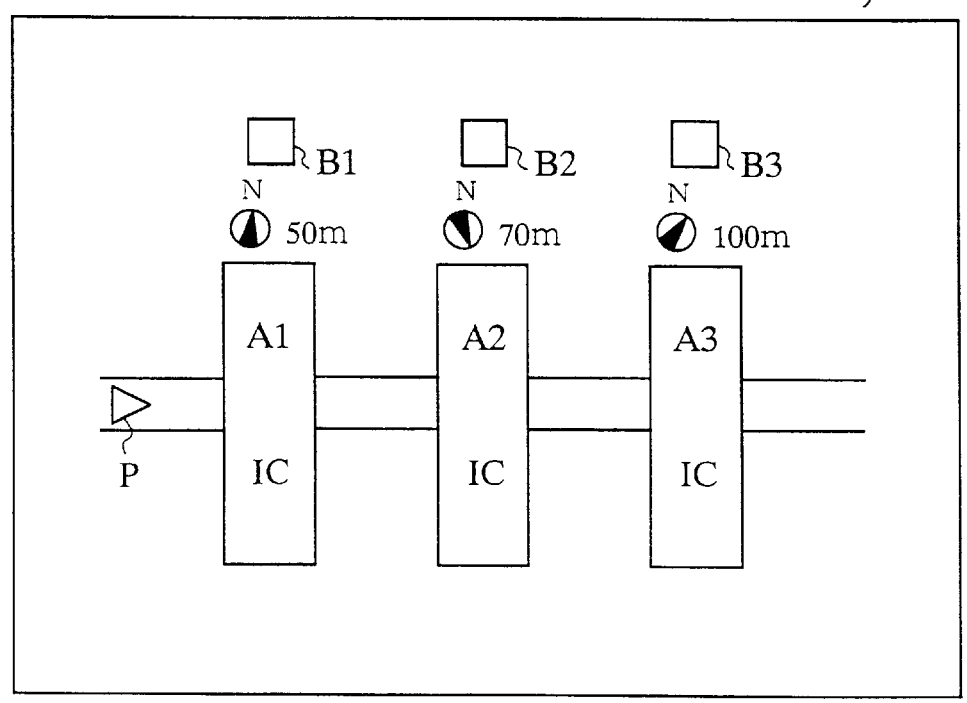
FIG. 51 is an explanatory diagram showing an example of displaying a bearing to a facility in the vicinity of an interchange (IC) and a facility on a schematic map of a display section of a vehicle navigation device according to a seventeenth embodiment of the present invention.
Figure 52:
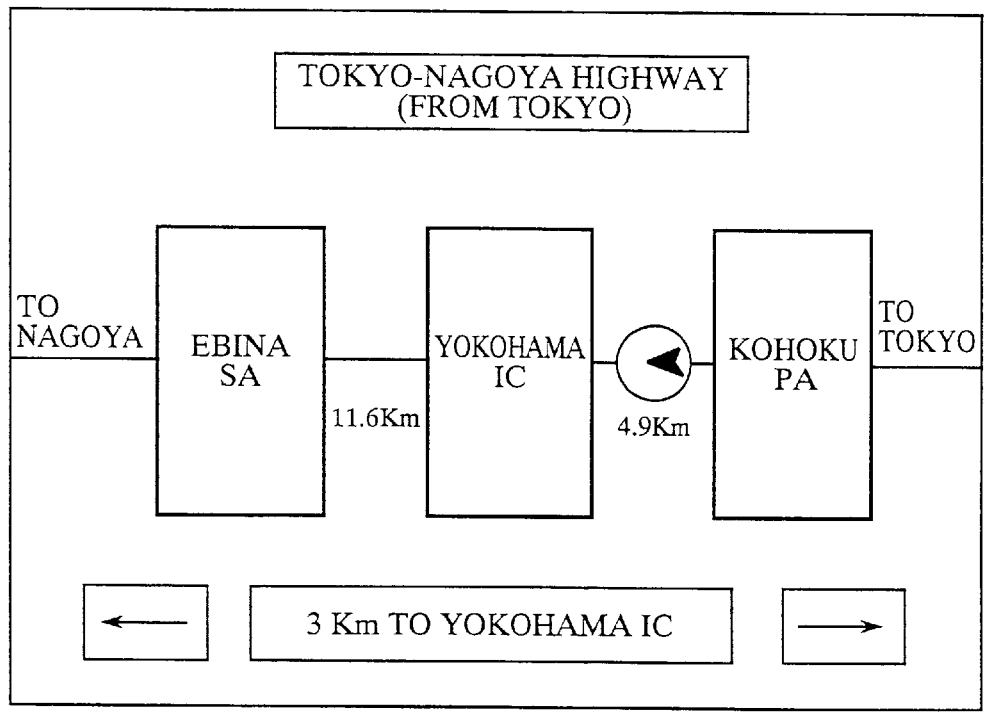
FIG. 52 is an explanatory diagram showing a display example of a crystal display acting as a display section in a conventional vehicle navigation device.
Figure 53:
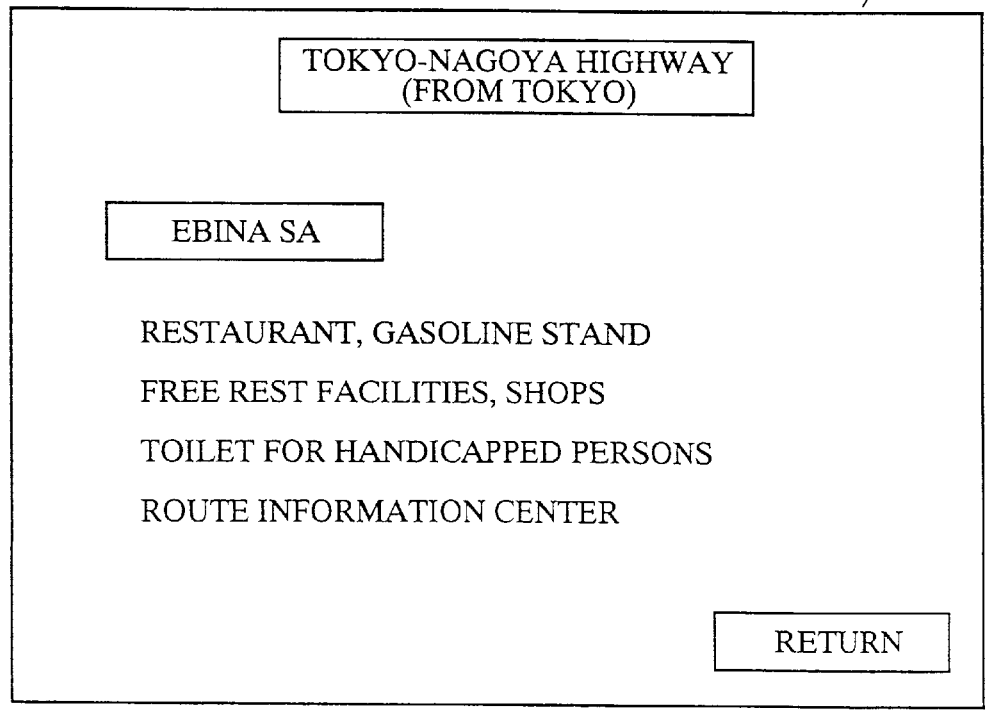
FIG. 53 is an explanatory diagram showing facility information display of a crystal display in a conventional vehicle navigation device as shown in FIG. 52.

FIG. 51 is an explanatory figure showing an example of displaying a bearing to facilities in the vicinity of an interchange (IC) and to the facility itself in a vehicle navigation device according to embodiment 17 of the present invention.

In the vehicle navigation device according to embodiment 17 of the present invention, a bearing to facilities in the vicinity of an interchange (IC) and to the facility itself are displayed on a schematic map displayed on a display section 9.

Next the operation of the invention will be explained.

The display of facilities at a fixed position (here on the upper side of letters) with respect to signs or letters showing an interchange (IC) displayed on a schematic map on a display section 9 allows the operator to easily recognize which facility in the vicinity of an interchange, for example a junction (JCT), ramp (R), service area (SA) or parking area (PA), is displayed. Here the arbitrary geographical point is taken to be the interchange A1, A2, A3.

The example shown in FIG. 51 shows the display of facilities on the upper section of each service area (SA) in a display example of a schematic map shown in FIG. 50 using the explanation of embodiment b 16. As shown in FIG. 51, since facilities B1, B2, B3 in the vicinity of the upper side of the interchange (IC) A1, A2, A3 are shown on the schematic map shown in the display section 9, the operator can easily understand what facility in the vicinity of an interchange is being displayed. Furthermore as in the display examples of embodiments 2, 3 as shown in FIGS. 8 and 12, it is possible to easily and quickly understand the schematic position of the facilities due to the fact that the distance and bearing are displayed in combination from the interchange to the facility on the schematic map. Furthermore it is possible to set a scenic or historical place as a facility.

As shown above, according to embodiment 17, since facilities corresponding to the vicinity of the interchange (IC) are displayed on the upper position of a plurality of interchanges (IC) on a schematic map displayed on a display section 9, the operator can easily understand which facility in the vicinity of an intersection is being indicated from amongst a plurality of displayed interchanges (IC). Furthermore since the distance and bearing from the interchange (IC) to the vicinity of the facility are displayed on the schematic map in combination, the operator can easily understand the abbreviated position from the interchange (IC) to the facility.

INDUSTRIAL APPLICABILITY

As shown above, the vehicle navigation device according to the present invention allows the operator with a simple and easy operation to quickly display facility information regarding each type of facility existing in the vicinity of an arbitrary geographical point of a road on a schematic map displayed on a display section such as a crystal display and is suitable to be adapted to in the rapidly expanding market for vehicle navigation devices.

What is claimed is:

1. A vehicle navigation device comprising a map information storage section which stores each category of information relating to a map, a schematic map calculation section which schematizes roads based on data stored in said map information storage section and which generates a schematic map, a distance calculation section which calculates a distance from an arbitrary or freely selectable geographical point to a facility, a display selection section which selects a facility shown on said schematic map based on a distance obtained from said distance calculation section, a display section which performs a display of a map and said schematic map and a display control section which displays said facility on said schematic map displayed on said display section.

2. The vehicle navigation device according to claim 1, wherein said display selection section selects an object within a fixed distance in the distance from said arbitrary or freely selectable geographical point, obtained by said distance calculation section, and a facility, and said display control section displays said facility selected by said display selection section on a schematic map displayed on said display section.

3. The vehicle navigation device according to claim 1, wherein said display control section displays a distance obtained from said distance calculation section at a position adjacent to said facility on said schematic map as information relating to said facility displayed on said display section.

4. The vehicle navigation device according to claim 1, further comprising a bearing calculation section which calculates a bearing from said arbitrary or freely selectable geographical point to said facility on the basis of data stored in said map information storage section and, on the basis of a calculation result obtained from said bearing calculation section, said display control section displays a bearing to said facility from an arbitrary or freely selectable geographical point on said schematic map as information about said facility displayed on said display section.

5. The vehicle navigation device according to claim 1, further comprising a trip calculation section which calculates, on the basis of stored data in said map information storage section, a running distance which must be traveled on an actual road map to said facility from arbitrary or freely selectable geographical point, said running distance from said arbitrary or freely selectable geographical point to said facility on said schematic map being set as a trip distance from an arbitrary geographical point on said schematic map to said facility.

6. The vehicle navigation device according to claim 5, wherein said display selection section selects an object whereby a trip from an arbitrary or freely selectable geographical point, obtained from said trip calculation section, to a facility is within a fixed distance and said display control section displays a value for said running distance selected by said display selection section on the side of said facility on said schematic map displayed on said display section.

7. The vehicle navigation device according to claim 1, further comprising a vehicle position detection section which detects a present position of said vehicle, said distance calculation section calculates a distance to a facility by setting a present position of a vehicle obtained from said vehicle position detection section as said arbitrary or freely selectable geographical point on said schematic map.

8. The vehicle navigation device according to claim 1, further comprising an arrival time calculation section which calculates the arrival time from said arbitrary or freely selectable geographical point to a facility, said display control section displays said arrival time from said arbitrary or freely selectable geographical point obtained from said arrival time calculation section to said facility as information about said facility on said schematic map on said display section.

9. The vehicle navigation device according to claim 1, further comprising an operational section by which an operator performs operations and a route calculation section which calculates a route to said selected facility by said operator using said operational section, said display control section displays a route obtained from said route calculation section on a schematic map displayed on said display section.

10. The vehicle navigation device according to claim 1, further comprising an operational section which selects a category of facility displayed on a schematic map displayed on a display section, an operator selects with said operational section a category of desired facility displayed on said display section of said schematic map, said route calculation section calculates a route from said arbitrary or freely selectable geographical point with respect to a facility obtained from said operational section and said display control section displays said route obtained from said route calculation section on said schematic map displayed on said display section.

11. The vehicle navigation device according to claim 1, further comprising a road attribute determination section which determines an attribute of a road based on data stored in said map information storage section and when said attribute of said road obtained from said road attribute determination section is an automobile-only road, said schematic map calculation section calculates a schematic map of said automobile-only road based on data stored in said map information storage section and selects a facility not placed on said automobile-only road and said display control section displays said automobile-only road and said facility selected by said schematic map calculation section on said schematic map displayed on said display section.

12. The vehicle navigation device according to claim 11, wherein said display selection device selects an object from within a fixed distance in a distance from said arbitrary or freely selectable geographical point obtained from said schematic map calculation section to said facility and said display control section displays said facility selected by said display selection section on a schematic map displayed on said display section.

13. The vehicle navigation device according to claim 1, wherein said schematic map calculation section calculates said schematic map to said facility by setting interchanges, junctions, ramps, service areas, parking areas as said arbitrary or freely selectable geographical point.

14. The vehicle navigation device according to claim 1, wherein said display control section displays a plurality of facilities in fixed positions corresponding respectively to said interchanges, junctions, ramps, service areas, parking areas on said schematic map so that an operator can accurately understand whether said plurality of facilities, on a schematic map displayed on a display section, are facilities in the proximity of an interchange, junction, ramp, service area and parking area from among any one of an interchange, junction, ramp, service area or parking area.

15. A vehicle navigation device provided with a map information storage section which stores each category of information relating to facilities and a road map, a control unit which stores and executes a program which reads information regarding said facilities and said roads stored in said map information storage section, schematizes said roads and generates a schematic map based on obtained information and selects said facility displayed on said schematic map corresponding to a distance from an arbitrary or freely selectable geographical point to a facility, and a display section which displays said facility and said schematic map which relates to said roads obtained from said control unit.

* * * * *

UNITED STATES PATENT AND TRADEMARK OFFICE
CERTIFICATE OF CORRECTION

PATENT NO. : 6,282,493 B1
DATED : August 28, 2001
INVENTOR(S) : Takakiyo Kitagawa and Hidehiko Ohki It is certified that error appears in the above-identified patent and that said Letters Patent is hereby corrected as shown below:

<u>Title page,</u>
Item [22], PCT Filed: delete "July 22, 1997" and insert -- July 2, 1997 --.

Signed and Sealed this

Sixteenth Day of April, 2002

Attest:

JAMES E. ROGAN
*Attesting Officer*    *Director of the United States Patent and Trademark Office*